(12) United States Patent
Aotsuka

(10) Patent No.: US 7,231,085 B2
(45) Date of Patent: Jun. 12, 2007

(54) COLOR IMAGE SIGNAL PROCESSING METHOD FOR CORRECTING HUE TURN AND COLOR IMAGE OUTPUTTING DEVICE AND IMAGING DEVICE

(75) Inventor: Yasuo Aotsuka, Miyagi (JP)

(73) Assignee: Fujifilm Corporation, Kanagawa (JP)

( * ) Notice: Subject to any disclaimer, the term of this patent is extended or adjusted under 35 U.S.C. 154(b) by 708 days.

(21) Appl. No.: 10/464,740

(22) Filed: Jun. 19, 2003

(65) Prior Publication Data

US 2004/0013296 A1  Jan. 22, 2004

(30) Foreign Application Priority Data

Jun. 21, 2002  (JP)  ............................ P2002-181354

(51) Int. Cl.
*G06K 9/00* (2006.01)
(52) U.S. Cl. ........................ 382/167; 348/651; 348/652
(58) Field of Classification Search ................ 348/653, 348/652, 649; 382/162, 167; 358/516, 501, 358/518, 520
See application file for complete search history.

(56) References Cited

U.S. PATENT DOCUMENTS

| | | | | |
|---|---|---|---|---|
| 5,999,230 A | * | 12/1999 | Tanabe | ........................ 348/649 |
| 6,504,952 B1 | * | 1/2003 | Takemura et al. | .......... 382/167 |
| 6,535,301 B1 | * | 3/2003 | Kuwata et al. | .............. 358/1.9 |
| 2003/0174222 A1 | * | 9/2003 | Uchida | ........................ 348/241 |

FOREIGN PATENT DOCUMENTS

JP  2003/111091 A  * 11/2001

* cited by examiner

*Primary Examiner*—Joseph Mancuso
*Assistant Examiner*—Nancy Bitar
(74) *Attorney, Agent, or Firm*—Birch, Stewart, Kolasch & Birch, LLP

(57) ABSTRACT

A chromaticity diagram is divided into a plurality of sections by a primary color line and a complementary color line of a color that does not cause hue turn, then it is decided to which section a color signal being output from an imaging device belongs, and then a color correcting operation is performed for the color signal every section. Accordingly, it is not needed to detect the flesh color itself when the hue turn of the flesh color is corrected by the color correcting operation. Any flesh color can be decided easily according to whether or not the color signal being output from the imaging device has entered into the section including the flesh color. Therefore, the appropriate color correcting operation can be applied to the flesh color.

12 Claims, 20 Drawing Sheets

SECTION 1

SECTION 2

SECTION 3

SECTION 4

FRESH COLOR

MACBETH COLOR CHECKER BLUE SKY

MACBETH COLOR CHECKER GREEN

COLOR IMAGE SIGNAL PROCESSING METHOD FOR CORRECTING HUE TURN AND COLOR IMAGE OUTPUTTING DEVICE AND IMAGING DEVICE

BACKGROUND OF THE INVENTION

1. Field of the Invention

The present invention relates to a color image signal processing method of reducing hue turn of a color image that is picked up by an imaging device such as a digital still camera, a digital video camera, or the like, a color image outputting device such as a color image printer, a color monitor, a digital color television set, or the like, and an imaging device such as a digital still camera, a digital video camera, or the like.

2. Description of the Related Art

In the solid-state imaging device such as CCD or the like used to pick up the color image by the digital still camera, the digital video camera, or the like, a color filter in any one color of three colors of red (R), green (G), and blue (B) is provided to each surface of each pixel (photodiode), and a signal charge that responds to an amount of incident light passed through each color filter is accumulated in each pixel. Then, the signal charge that responds to an amount of incident light in each color is read from each pixel. Thus, the color of the incident light on each pixel position can be reproduced from respective amounts of signal charges in three colors.

The solid-state imaging device reproduces the color of the incident light by classifying the incident light into three colors and then accumulating an amount of signal charge, which is in proportion to an amount of incident light in each color, in each pixel. In this case, there is an upper limit to an amount of signal charge that each pixel of the solid-state imaging device can accumulate. Thus, there is such a restriction that the signal charge that exceeds an amount of saturation charge of the photodiode constituting the pixel cannot be accumulated.

In other words, if an amount of signal charge that responds to an amount of incident red-color light, for example, out of the incident light exceeds an amount of saturation charge of the photodiode because of generation of the overexposure, the color that is reproduced by amounts of signal charges of the green color and the blue color, which do not reach an amount of saturation charge respectively, and an amount of signal charge of the red color (which reaches an amount of saturation charge) lacks a tinge of red. Therefore, the so-called "hue turn" is caused.

In the recent solid-state imaging device, the number of pixels is increased enormously with the progress of the miniaturization technology, and thus a resolution force has a capability that comes up to that of the silver photography. However, because the pixel is miniaturized, each pixel is reduced in size correspondingly and then an amount of saturation charge of each pixel becomes small. Thus, there is such a problem that the image picked up by the solid-state imaging device does not come to the silver photography in respect of the color reproducing characteristic. In particular, there is such a problem that, since the human eye is sensitive to the flesh color, yellowish change of the flesh color stands out clearly when such flesh color is picked up at the overexposure.

Another reason may be considered as the cause that brings about the hue turn. First, respective amounts of signal charges corresponding to R, G, B, which are input from respective pixels of the solid-state imaging device, are converted into, for example, 10-bit digital data by an A/D converter, and then converted into, for example, 8-bit digital data by the γ transformation based on the γ characteristic shown in FIG. 34. Then, such data are recorded as the final image via various signal processes. When the image is displayed on the standard CRT, the characteristic curve of the relationship between the output luminance and the luminance of the original scene is given by a straight line, where an ordinate denotes log [maximum output luminance/output luminance] and an abscissa denotes log [input luminance (luminance of the original scene)] (where a unit is arbitrary). However, as shown in FIG. 35, actually a gradient of the characteristic curve in the high luminance range is set gently such that the high-luminance image can also be expressed.

Ratios of the input signals R, G, B in any color (e.g., R/G, B/G) are constant how an amount of exposure should be changed. That is, intervals between R, G, B are maintained constant on the abscissa in FIG. 35. Therefore, ratios of the output signals Ro, Go, Bo of this color (e.g., Ro/Go, Bo/Go) are constant in the range in which the characteristic curve is given by the straight line, and thus the hue turn does not occur. In contrast, output ratios of R. G, B (e.g., Ro/Go, Bo/Go) are changed in the high luminance range, i.e., in the range in which the characteristic curve is given not by the straight line but by the curvature, and thus the hue turn is generated. The hue turn caused based on this characteristic curve can be eliminated by correcting the characteristic curve in FIG. 34 to the straight line up to the high luminance range, but the high-luminance image cannot be expressed in such case. As a result, the necessity for overcoming the problem of the hue turn by other approaches arises.

SUMMARY OF THE INVENTION

The object of the invention is to provide a color image signal processing method, a color image outputting device and an imaging device that are capable of reducing the hue turn to get a color image with the excellent color reproducing characteristic.

The invention provides a color image signal processing method that has the steps of dividing a chromaticity diagram into a plurality of sections by at least one of primary color lines and at least one of complementary color lines of colors that do not cause hue turn; deciding to which section a color signal output from an imaging device belongs; and performing a color correcting operation for the color signal in each sections. According to this method, when the hue turn of the flesh color is corrected by the color correcting operation, it is unnecessary to detect the flesh color itself. The appropriate color correcting operation can be applied to any flesh colors by deciding whether or not the color signal output from the imaging device belongs to the section including the flesh color.

Further, the color correcting operation is performed after transforming color differences obtained from the color signal into values on an orthogonal coordinates consisting of a primary color axis and a complementary color axis. According to this method, the color correcting operation can be facilitated and thus load of the operation can be reduced.

Further, the color correcting operation is performed by multiplying the color difference obtained from the color signal or component of primary or complementary color axis coordinate by a luminance dependency coefficient for correcting the hue turn. According to this method, the color correcting operation can be facilitated and thus load of the operation can be reduced.

Moreover, the method further has the steps of: obtaining a difference of luminance between the color signal and a first color gamut marginal surface which is obtained by multiplying a second color gamut marginal surface on a high luminance side with a color difference matrix=1 by a color difference matrix of an imaging device; correcting then the luminance dependency coefficient is corrected in dependence on the difference. According to this method, the hue turn caused due to a curvature of the characteristic curve can be appropriately amended by the color correcting operation.

Further, the color correcting operation is performed for color signals that belong to a section, which includes flesh color, by using a first luminance dependency coefficient. According to this method, the same color correcting operation may be performed for the colors that belong to the same section, and thus load of the operation can be reduced.

Further, the color correcting operation is performed for colors that belong to at least one of other sections, which do not include the flesh color, by using a second luminance dependency coefficient that is different from the first luminance dependency coefficient. According to this method, the color correction can be optimally performed by executing the color correcting operation in every section.

Further, a value of the second luminance dependency coefficient is calculated by amending a value of the first luminance dependency coefficient. According to this method, an amount of data of the luminance dependency coefficient used in the color correcting operation can be reduced.

Further, the color correcting operation is performed after a calculation of expanding or contracting the second luminance dependency coefficient is executed in at least one of other sections that do not include the flesh color. According to this method, lack of the chroma caused by color correcting operation can be avoided.

Moreover, the method further has: after the step of performing the color correcting operation, shifting chromaticity points onto the color gamut marginal surface on the high luminance side with the color difference matrix=1 by correcting a luminance value and the color differences (component of primary or complementary color axis coordinate) of the color signals only in colors positioned on a higher luminance side than the color gamut marginal surface. According to this method, reduction in the correction of the hue turn and improvement in the chroma, when the color image is output, can be decreased.

Moreover, the method further has: deciding whether or not the color signal causes the hue turn, wherein the color correcting operation is performed only for the color signal that is decided as the color that caused the hue turn. According to this method, since no correction is executed for the colors that did not cause the hue turn, improvement of the picture quality can be further achieved.

The object of the invention is to provide a color image outputting device for performing the color image signal processing method. According to this apparatus, the color image that is excellent in the color reproduction characteristic can be output.

The object of the invention is to an imaging device into which a processing device for performing the color image signal processing method. According to this apparatus, image data that is excellent in the color reproduction characteristic can be picked up.

DETAILED DESCRIPTION OF THE PREFERRED EMBODIMENTS

An embodiment of the present invention will be explained with reference to the drawings hereinafter.

Figure 1:
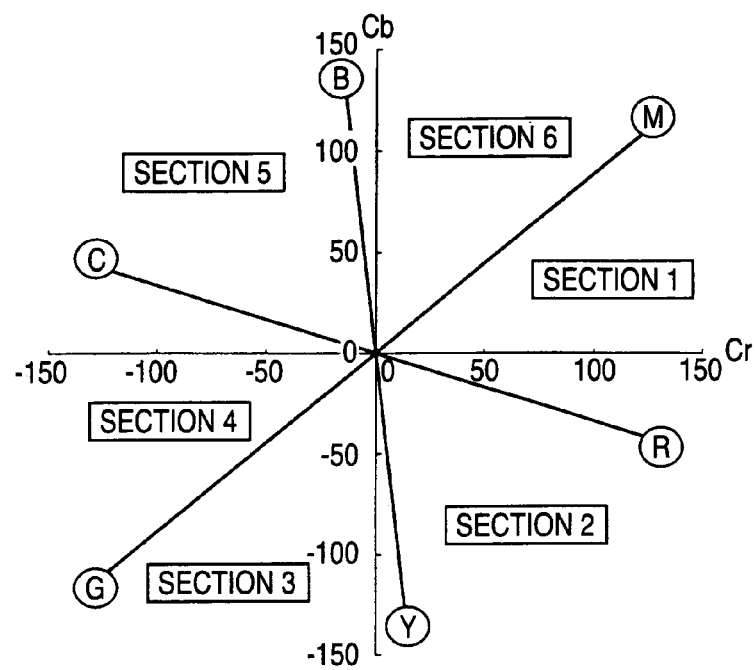
FIG. 1 is a Cr-Cb chromaticity diagram explaining a color image signal processing method of an embodiment of the present invention.

FIG. 1 is a chromaticity diagram, wherein an ordinate denotes a color difference Cb(=−0.169R−0.332G+0.500B) and an abscissa denotes a color difference Cr(=−0.500R−0.419G−0.081B). This chromaticity diagram is divided into 6 sections by primary color lines R, G, B and complementary color lines C (cyan), M (magenta), and Y (yellow) that extend to the opposite direction to the primary color lines R, G, B from an origin respectively. Every color is expressed on the chromaticity diagram and belongs to any section.

Normally, the color image picked up by the solid-state imaging device generates the hue turn not only in the flesh color but also in most colors. However, there are six colors that do not substantially generate the hue turn. These six colors are such colors in which amounts of two signal charges in R, G, B signals are equal to each other. More particularly, these six colors are blue (B>R=G), yellow (B<R=G), red (R>G=B), cyan (R<G=B), green (G>B=R), and magenta (G<B=R). These six colors never substantially generate the hue turn, no matter what characteristic curve (or $\gamma$ transformation characteristic) the imaging device has.

When chromaticity points (Cr, Cb) of these six colors recorded by the imaging device are plotted on the chromaticity diagram to know what loci are depicted by these chromaticity points together with the exposure, every color gives a line segment that extends from the origin (0, 0) and then returns to the origin again. Since such line segment is depicted based on digitized values, a notch-like folded line is depicted in detail, but essentially such line segment is a straight line. The chromaticity diagram is partitioned into six sections by straight lines of these six colors (primary color lines R, G, B and complementary color lines Y, M, C).

Figure 2:
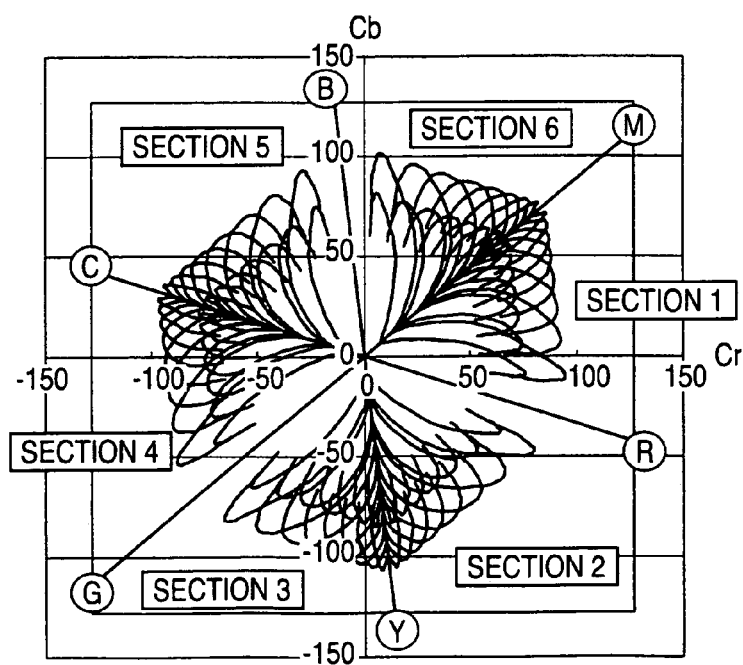
FIG. 2 is a graph in which linking loci are detected by imaging any colors by virtue of a digital still camera.

FIG. 2 is a view examining loci that any colors (about 90 colors are displayed in FIG. 2) as well as the exposure depict on the chromaticity diagram, in a digital still camera using CCD having the primary color (R, G, B) system spectral sensitivity. As can be seen from FIG. 2, even when an amount of exposure is changed, the color belonging to any one section of these sections still stays in that section and never protrudes into the neighboring section.

Also, it is understood that an amount of any signal charge of R, G, B is saturated at the overexposure in any color and then the hue turns like a loop along the direction being directed from the primary color line of the section, to which the color belongs, to the complementary color line with the increase of an amount of exposure. For example, the loop-like locus directed from the primary color line R to the complementary color line M is depicted in the section 1 that is put between the primary color line R and the complementary color line M, while the hue turns like a loop along the direction directed from the primary color line R to the complementary color line Y in the section 2 that is put between the primary color line R and the complementary color line Y. Six sections are called sections 3, 4, 5, 6 clockwise hereinafter.

With the above, it is understood that the image signal processing for correcting the hue turn can be applied to every section of above six sections. In particular, it is understood that, if the hue turn of the flesh color is to be corrected, the hue turn in the section 2 to which the flesh color belongs should be corrected.

However, the flesh colors are different according to the human races and also the flesh colors become different according to ages and sexes of the people. In this case, the flesh colors of all the people of all ages and both sexes in all human races always belong to the section 2, and also the flesh color that caused the hue turn belongs to the section 2. Therefore, the hue turn of the flesh color can be corrected by applying the correction of the hue turn to the section 2.

In the prior art, the flesh color in the color image is detected by any method since the hue turn of the flesh color is conspicuous, and then such flesh color is corrected. However, it is impossible to say any more that the flesh color that caused the hue turn is the flesh color. Therefore, it is extremely difficult to detect the flesh color. In contrast, in the present embodiment, it is decided whether or not the color belongs to the section 2 without the detection of the flesh color. Therefore, the decision is facilitated.

Figure 4A:
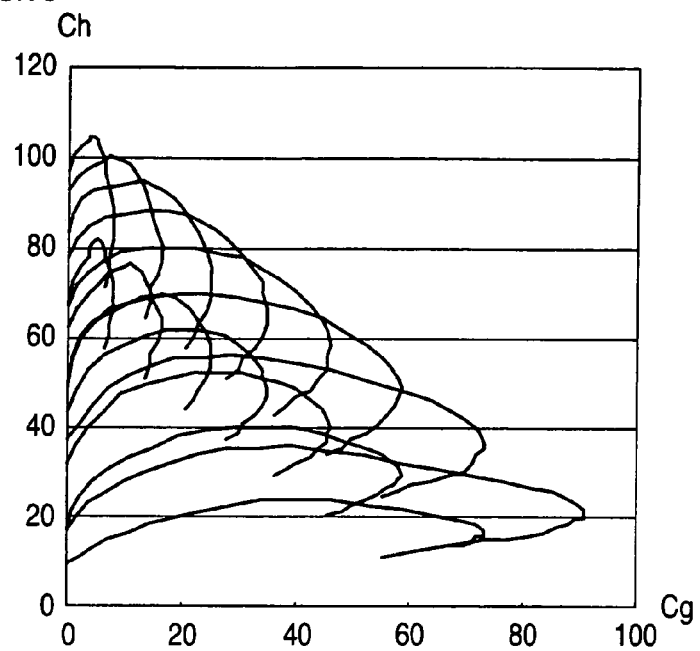
FIGS. 4A and 4B are graphs transforming a section 3 and a section 4 shown in FIG. 2 into the Cg-Ch coordinate.
Figure 4B:
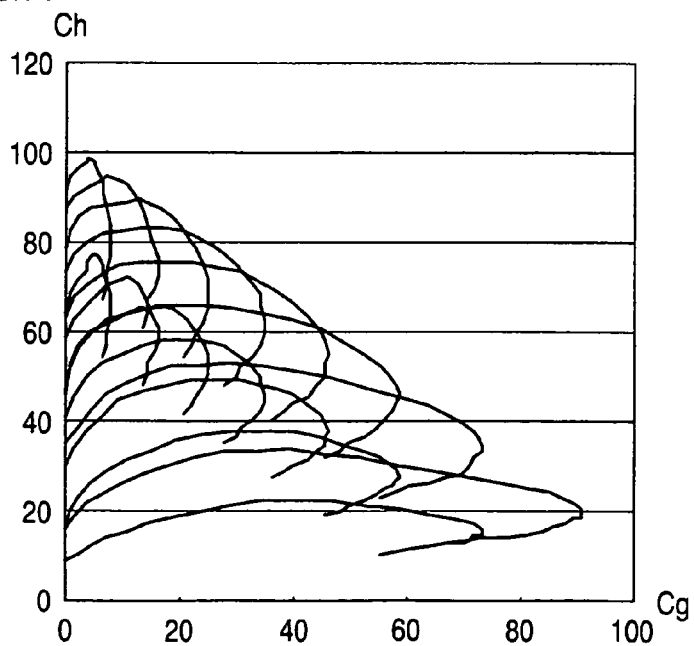
Figure 5A:
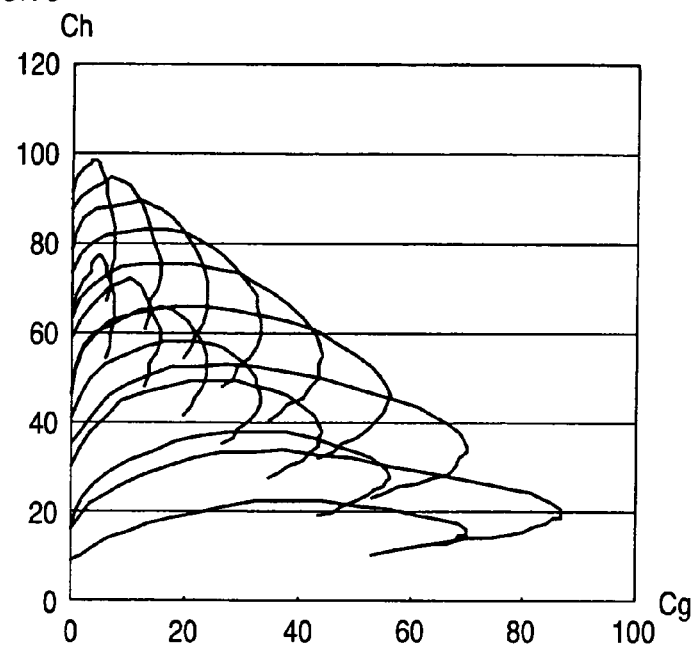
FIGS. 5A and 5B are graphs transforming a section 5 and a section 6 shown in FIG. 2 into the Cg-Ch coordinate.
Figure 5B:
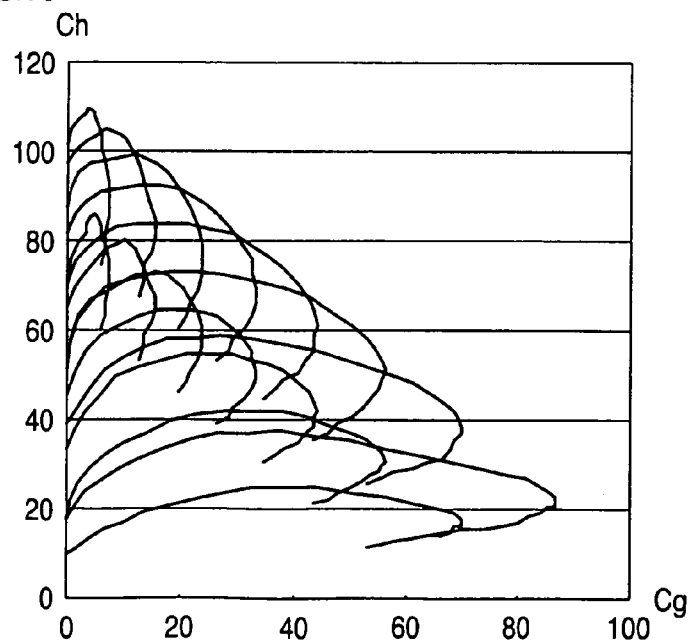

FIG. 3, FIG. 4, and FIG. 5 are graphs in which the coordinate transformation is applied to the graph shown in FIG. 2 while setting the primary color lines (R, G, B) in respective sections as an abscissa (referred to as "Cg" hereinafter) of the orthogonal coordinates and setting the complementary color lines (Y, M, C) as an ordinate (referred to as "Ch" hereinafter) of the orthogonal coordinates. The abscissa and the ordinate are respectively denoted as a primary color axis and a complementary color axis respectively. It can be understood from these figures that the hue turn exhibits the same tendency in any section and therefore the hue turn can be corrected by the same signal process in any section.

The hue turn becomes conspicuous particularly in the flesh color. For this reason, in the present embodiment, the image signal processing method of correcting the hue turn in the section 2 is decided at first, and then correcting points required when this image signal processing method for the section 2 is applied to other sections are discussed. In this case, since the human eye is insensitive to the hue turn of the color except the flesh color, the correction of the hue turn about the color belonging to the sections except the section 2 may be omitted to reduce the load in the signal processing.

Figure 6:
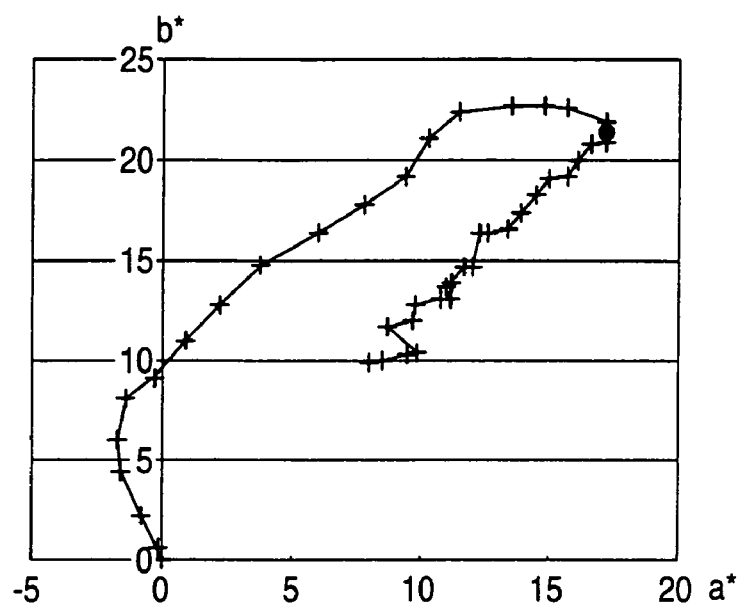
FIG. 6 is an a*-b* chromaticity diagram simulating the hue turn of the flesh color.
Figure 7:
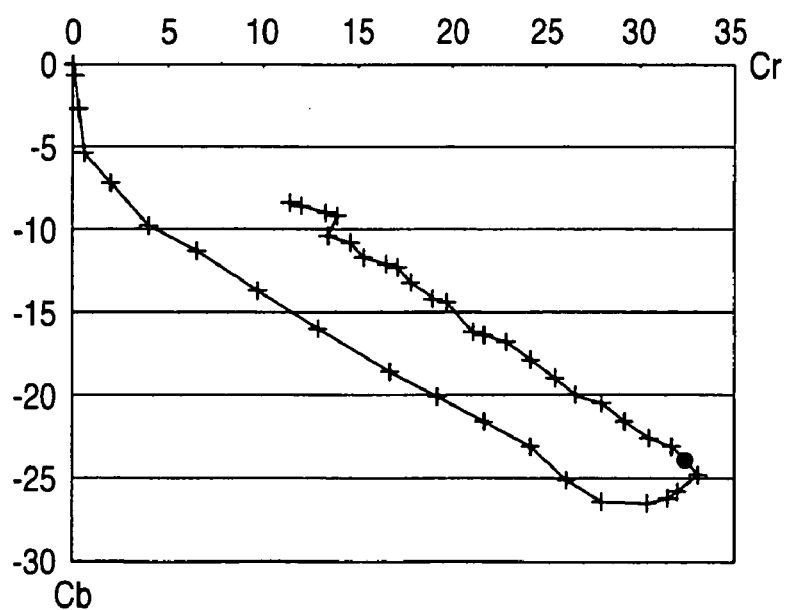
FIG. 7 is a Cr-Cb chromaticity diagram simulating the hue turn of the flesh color.

FIG. 6 is a*-b* chromaticity diagram in which simulation of the hue turn of the flesh color is carried out. FIG. 7 is Cr-Cb chromaticity diagram in FIG. 6. A black round mark in FIG. 6 and FIG. 7 shows the chromaticity point of the flesh color at the proper amount of exposure, and this point is set as a reference value. The chromaticity points of the flesh color, which are recorded by dividing the exposure range extending from the underexposure, which is about ⅛ times of the reference value, to the overexposure, which is about five times of the reference value, by a pitch of $2^{1/8}$, are shown by X marks, and then these marks are connected sequentially by a line.

Figure 8:
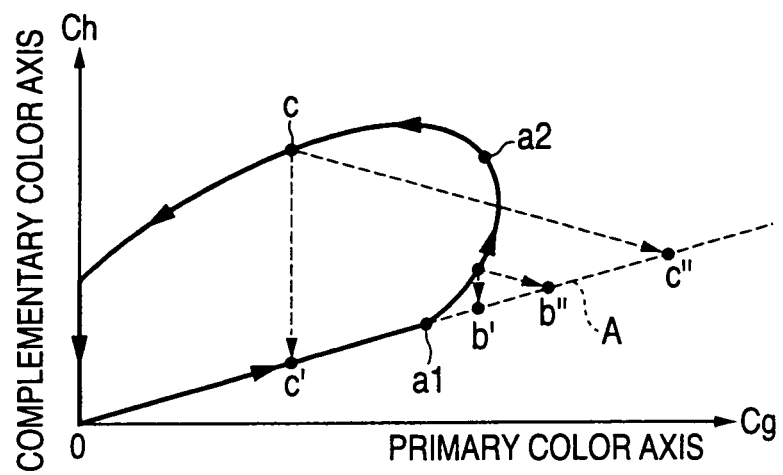
FIG. 8 is a view explaining the hue turn of the color.

FIG. 8 is a explanatory view of the hue turn of the color shown in FIGS. 3A and 3B, FIGS. 4A and 4B, and FIGS. 5A and 5B. The hue is expressed approximately by Cb/Cr. Since the coordinate transformation from the Cr-Cb system to the Cg-Ch system is the linear transformation that uses the origin commonly, holding of the Cb/Cr value is equal to holding of the Ch/Cg value. In FIG. 8, a straight line A of Ch/Cg=constant indicates that the hue is constant. If a locus of the color is on the straight line A, the hue turn is not caused. However, if an amount of exposure is gradually increased, the color traces such a locus that it moves on the straight line A from the origin, then separates from the straight line A at a point a1, and then turns round largely toward the complementary color axis gradually to return to the origin.

The hue turn in the range from a point a1 to a point a2 is due to the bend of the characteristic curve from the straight line on the high luminance side. The hue turn that turns round largely from a point a2 to the origin is due to the saturation of at least one of the R, G, B signals.

If both hue turns are corrected in such a manner that the Ch/Cg (or Cb/Cr) value can have the proper value, the hue turns can be reduced. This can be implemented by multiplying (or dividing, the same in the following) Cr or Cb by a coefficient with a luminance dependency (referred to as a "luminance dependency coefficient K(Y)" hereinafter) or multiplying Cg or Ch by the luminance dependency coefficient K(Y).

In FIG. 8, if the color of any point b in the range between the point a1 and the point a2 is corrected onto the straight line A and also the color of any point c in the range between the point a2 and the origin is corrected onto the straight line A, the hue turns can be reduced. In other words, if the colors of the points b, c are corrected to the colors of points b', c' respectively by multiplying complementary color axis coordinate components (Ch) of the colors of respective points b, c by the luminance dependency coefficient K(Y) and then projecting respective points b, c onto the straight line A in parallel with the complementary color axis, the hue turns can be reduced.

Figure 35:
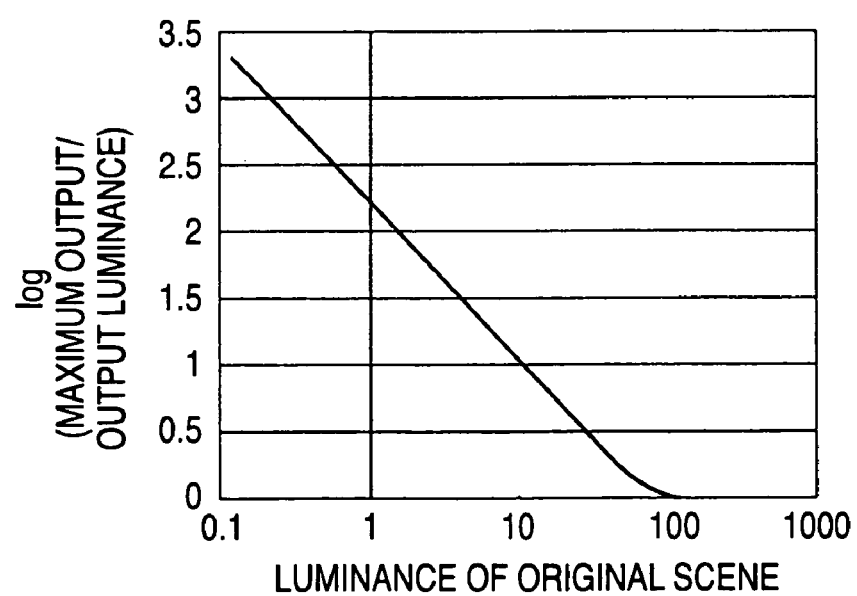
FIG. 35 is a graph showing the characteristic curve based on the $\gamma$ transformation characteristic in FIG. 34.

The correcting operation by using the luminance dependency coefficient K(Y) may be applied uniformly to the colors in the concerned section. But it is preferable that such correcting operation should be applied only to the color that generates the hue turn. More particularly, the correcting operation is applied to the color in which any of the R, G, B signal charges is saturated and also the correcting operation is applied to the color whose luminance is in excess of a predetermined luminance (the color corresponding to the region where the characteristic curve given by a straight line in FIG. 35 is curved), but the color all R, G, B signal charges of which are less than an amount of saturation charge and whose luminance is below the predetermined luminance is output as it is without the correcting operation.

Figure 3A:
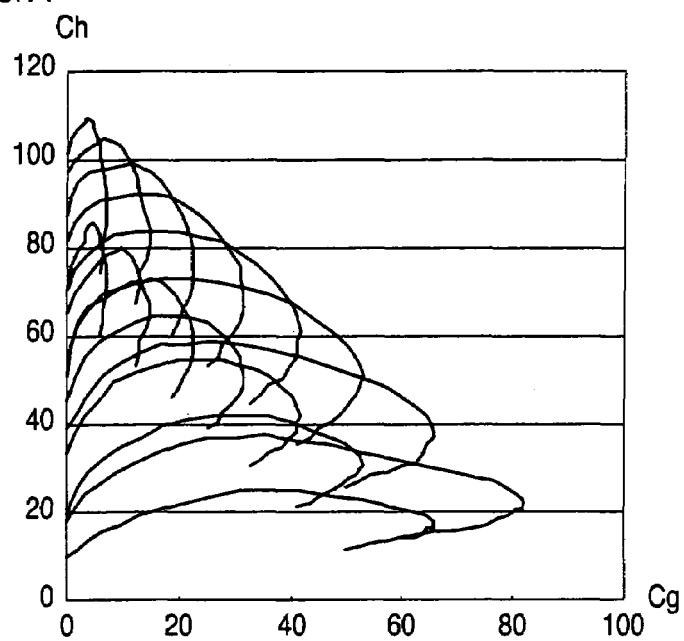
FIGS. 3A and 3B are graphs transforming a section 1 and a section 2 shown in FIG. 2 into a Cg-Ch coordinate.
Figure 3B:
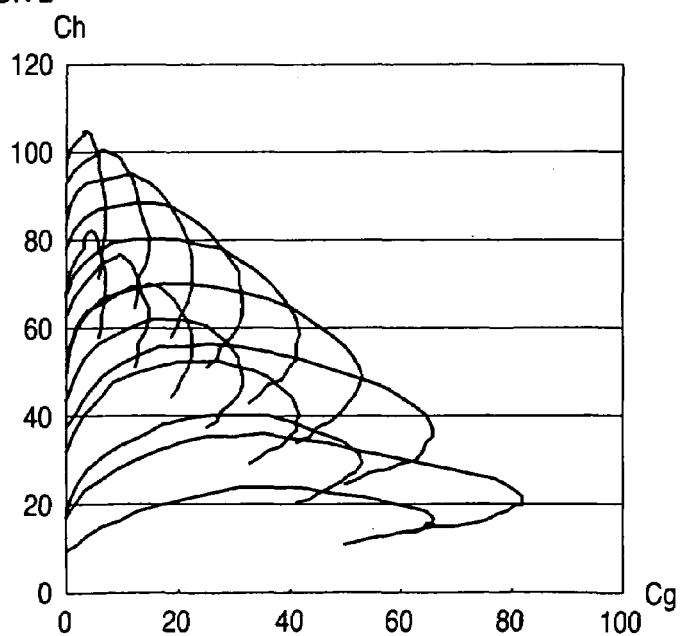

In this case, the colors that caused the hue turn are present in large number in each section. For example, in FIG. 3A showing the section 1, respective loci of almost 15 colors that caused the hue turn are exemplified. Though gradients of the constant hue straight lines of respective colors are different mutually, the colors that caused the hue turn can be corrected approximately onto respective constant hue straight lines by multiplying such colors by the same luminance dependency coefficient K(Y) uniformly.

The colors, in which any of the R, G, B signals is saturated, out of the colors that caused the hue turn are present on a color gamut marginal surface described later. Conversely speaking, all the colors on the color gamut marginal surface on the high luminance side correspond to the colors in which any of the R, G, B signals is saturated to cause the hue turn. Therefore, the correcting operation using the luminance dependency coefficient K(Y) is applied to the colors on the color gamut marginal surface on the high luminance side.

Figure 9:
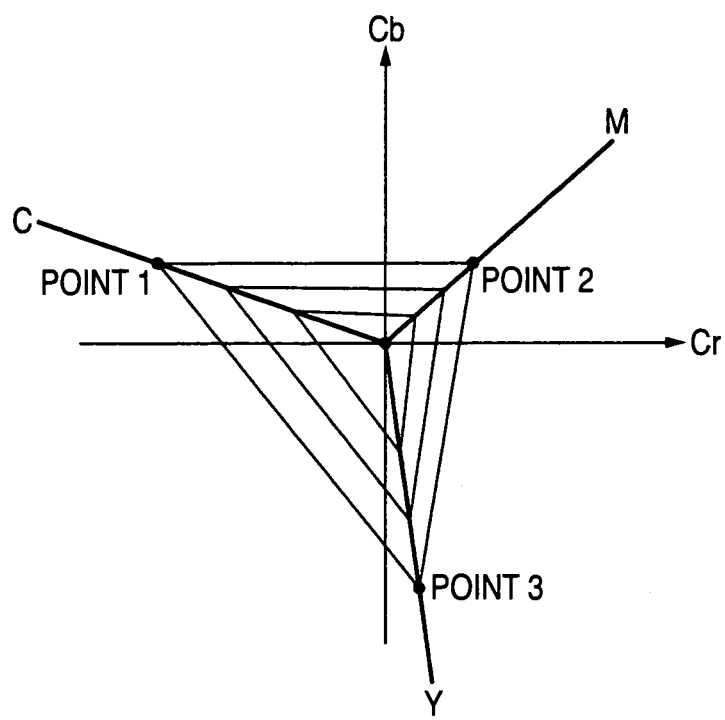
FIG. 9 is a chromaticity diagram showing color gamut marginal surfaces of a triangular pyramidal shape.

FIG. 9 is a chromaticity diagram shown in FIG. 1, wherein an abscissa denotes the Cr axis and an ordinate denotes the Cb axis. In the chromaticity diagram in FIG. 9, the axis of the luminance is set as the axis that extends perpendicularly to the front side of this sheet. The value of luminance has 0 to 255 values in the 8-bit system, and the maximum value is "255". Here, the color gamut marginal surface on the high luminance side at the time of the color difference matrix=1 (this is referred to as a "color gamut marginal surface 0" hereinafter) is considered. The color gamut marginal surface 0 is a surface that contains any two points of three points given in the following and a vertex [(luminance, Cr, Cb)=(255, 0, 0)].

Point 1 (165, −150.5, 50.75)
Point 2 (165, 64.15, 50.75)
Point 3 (165, 64.15, −394.4)

That is, the color gamut marginal surface 0 has a triangular pyramidal shape, and the above complementary color lines M, C, Y (where the complementary color lines in the case of C-MTX=1) overlap with edge line that pass through the vertex of the triangular pyramid in FIG. 9 respectively.

Figure 10:
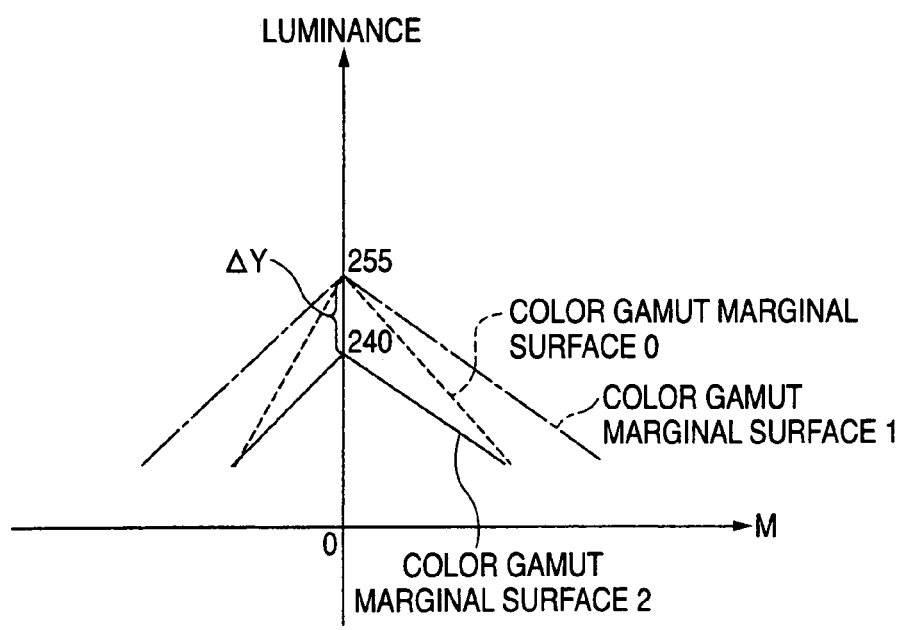
FIG. 10 is an explanatory view showing the state that the color gamut marginal surfaces shown in FIG. 9 are cut along a luminance axis.

In contrast, a color gamut marginal surface of a certain imaging device (this is referred to as a "color gamut marginal surface 1" hereinafter) is different according to the color difference matrix that is decided by the imaging device. In particular, the color gamut marginal surface 0 at the time of the color difference matrix=1 is transformed into the color gamut marginal surface 1 by the color difference matrix. Similarly the complementary color lines and the primary color lines at the time of the color difference matrix=1 are transformed into new complementary and primary color lines by the color difference matrix of the imaging device. The state that the triangular pyramid of the color gamut marginal surface 0 is cut along the plane containing the complementary color line M and the luminance axis, for example, in FIG. 9 is shown in FIG. 10. In FIG. 10, a dotted line corresponds to the color gamut marginal surface 0, and then the color gamut marginal surface 1 indicated by a dot-dash line is derived from multiplying this marginal surface 0 by the color difference matrix of the imaging device.

In this manner, the color gamut marginal surface 1 of the imaging device can be obtained. If the color gamut marginal surface 1 is viewed every above section, respective surfaces are represented as the plane. Thus, according to whether or not the color recorded by the imaging device is present on that plane, it can be decided whether or not such color is the color on the color gamut marginal surface 1. The color on the color gamut marginal surface 1 is the color that caused the hue turn by the saturation extending from the point a2 to the origin explained in FIG. 8. Therefore, if the recording color of the imaging device exits on the color gamut marginal surface 1, the hue turn is corrected by multiplying such recording color by the luminance dependency coefficient K(Y) uniformly. The color gamut marginal surface is not an infinite plane but a finite plane having the limitation. However, in the correcting operation of the color signal in this embodiment, no trouble is caused substantially even if such marginal surface is treated as the infinite plane.

The gradients (Cb/Cr ratios) of the complementary color lines on the chromaticity diagram in FIG. 9 are given as follows.

tan Y0 (gradient of a yellow line)=−6.1478
tan M0 (gradient of a magenta line)=0.79102
tan C0 (gradient of a cyan line)=−0.33740

A color gamut of the color difference matrix=1 coincides with a color gamut of the standard CRT that outputs the image of the imaging device.

Since another cause for bringing about the hue turn is the curvature of the characteristic curve explained in FIG. 35, it is desired that the hue turn of the recording color, which extends to the top end (i.e., saturation) of the characteristic curve after an amount of exposure comes to this curvature point, should be corrected. This marginal surface of a color space portion in which the hue turn also does not occur (this is referred to as a "color gamut marginal surface 2" hereinafter) can be easily detected. The color gamut marginal surface 1 may be lowered by ΔY in the luminance axis direction. That is, if the luminance value of the curvature starting point of the straight line in FIG. 35 is assumed as "240" in FIG. 35, the color gamut marginal surface 2 may be obtained by lowering the color gamut marginal surface 1 by ΔY=255−240=15 in FIG. 10.

The colors in the color space that is put between the color gamut marginal surface 1 and the color gamut marginal surface 2 correspond to colors between the point a1 and the point a2 in FIG. 8. It is preferable that, since all the colors causes the hue turn, these colors should be corrected by multiplying the luminance dependency coefficient K(Y). In this case, the luminance dependency coefficient K(Y) that is used to correct the hue turn due to the saturation is not applied as it is, but a contracted (relaxed) value of the luminance dependency coefficient K(Y) is applied, as described later. Then, since the hue turn is not caused in the low luminance portion in which the luminance is low rather than the color gamut marginal surface 2, the colors should not be corrected.

More particularly, it is decided by using the luminance value Y and the color difference Cr, Cb values, which are recorded by the imaging device such as the digital still camera, or the like, whether or not the recording color is positioned between the color gamut marginal surface 1 and the color gamut marginal surface 2. Then, if the recording color is positioned between them, the value of the luminance dependency coefficient K(Y) used in the correcting operation of the hue turn is amended to the value that is close to 1.0 in response to distances (differences in the luminance) from both color gamut marginal surfaces 1, 2, and then such value is employed in place of the above luminance dependency coefficient K(Y).

For example, the luminance dependency coefficient K(Y) is applied, as it is, to the colors that exist on the color gamut marginal surface 1. If the colors are present lower than the color gamut marginal surface 1 (the luminance is lower) but higher than the color gamut marginal surface 2, the luminance dependency coefficient K(Y) is amended into a value of (1−(1−K(Y))×S). Where S has a value in a range of "0" to "1", and "1" is set on the color gamut marginal surface 1 and "0" is set on the color gamut marginal surface 2.

If doing so, it is possible that the color that did not cause the hue turn is maintained as it is and the correction is applied to the color that caused the hue turn.

The above correction operation of the hue turn is to correct the colors at the point b and the point c into the colors at the point b' and the point c' in FIG. 8. In this case, distances of the corrected point b', c' from the origin are shorter than distances of the points b, c respectively, so that the chroma are lowered. Because lack of the chroma causes the deterioration of picture quality, preferably the colors should be corrected to not the point b' and the point c' but a point b" and a point c" in FIG. 8.

The chroma of the color is expressed as a distance from the origin (achromatic color) on the chromaticity diagram. That is, the chroma becomes higher as the position goes away from the origin. Normally the chroma of the color is recorded lower at the overexposure to the extent that causes the saturation. At the end, the chroma=0, i.e., the color becomes white (called "whitish saturation"). The whitish saturation is generated when all R, G, B are saturated, and is decided according to the extension of the characteristic curve of the imaging device to the high luminance side (dynamic range). The whitish saturation is difficult to occur as the dynamic range becomes wider. Though the dynamic range is narrow, the apparent whitish saturation becomes small if the chroma reproducibility in the high luminance range is high. Also, this effect can be exhibited when the dynamic range is wide.

Therefore, it is preferable that the signal processing for improving the chroma should be executed when the correction of the hue turn, i.e., the correcting operation by using the luminance dependency coefficient is carried out. In more detail, the Cr expanding process or the Cg expanding process is performed particularly in the section 2 that contains the flesh color. The expanding process means to convert the original value into the value larger than the original value. The Cg expanding process is to expand the Cg value in parallel with the primary color axis, but expansion of the Cg value in the slightly inclined direction is also effective.

More particularly, as shown in examples of projection from the point b to the point b" and from the point c to the point c" in FIG. 8, the gradient in the expanding direction is set in a range of less than "0" (angle=0°, i.e., parallel with the primary color axis) and more than "−1" (angle=−45°) Especially, it is preferable in a point of improving the chroma that the gradient should be set in a range of −0.5 to −0.05.

As described above, the hue turn in the high luminance range is caused by the situation that any of R, G, B is saturated, and the chromaticity point is on the color gamut marginal surface 1. Hence, the application of the expanding process means to move the chromaticity point from the color gamut marginal surface to the outside. The image having data of the chromaticity points, which are subjected to the correction operation from the color gamut marginal surface to the outside, can be recorded in the memory of the imaging device such as the digital still camera, or the like. However, the image is included forcedly in the color gamut of the monitor or the printer when such image is output to the monitor or the printer to observe, and therefore the effect of correcting the hue turn and the effect of improving the chroma are reduced.

Therefore, it is preferable that the expanding process should be applied by using an expansion factor that is defined to estimate this reduction amount. In other words, the correcting operation is performed by using the luminance dependency coefficient that is set excessively at first sight, and then the proper hue is reproduced when the image is output by using R, G, B converted. Otherwise, any one of following processes (a)(b)(c) must be performed. In this case, as the color gamut mentioned herein, normally the color gamut of the standard monitor is used but the color gamut of the particular monitor or the particular printer may be used.

(a) Only when the chromaticity point obtained after the above correction operation is performed is positioned on the outside of the color gamut marginal surface, the luminance (Y) is lowered to move the chromaticity point onto the color gamut marginal surface 0 or the color gamut marginal surface 1.

(b) Only when the chromaticity point obtained after the above correction operation is performed is positioned on the outside of the color gamut marginal surface, the correction including not only the luminance (Y) but also Cr, Cb while maintaining the Cb/Cr ratio is executed to move the chromaticity point onto the color gamut marginal surface 0.

(c) Both the process (a) and the process (b) are performed. That is, the chromaticity point is moved onto the color gamut marginal surface 1 by the process (a), and then the chromaticity point is moved onto the color gamut marginal surface 0 by the process (b).

In this case, it is preferable that the processes (a)(b)(c) are applied before various processes using the luminance signal, for example, the sharpness enhancing process, etc. are performed. This is because, unless doing so, it seems possible that roughness of the image becomes worse.

Figure 11:
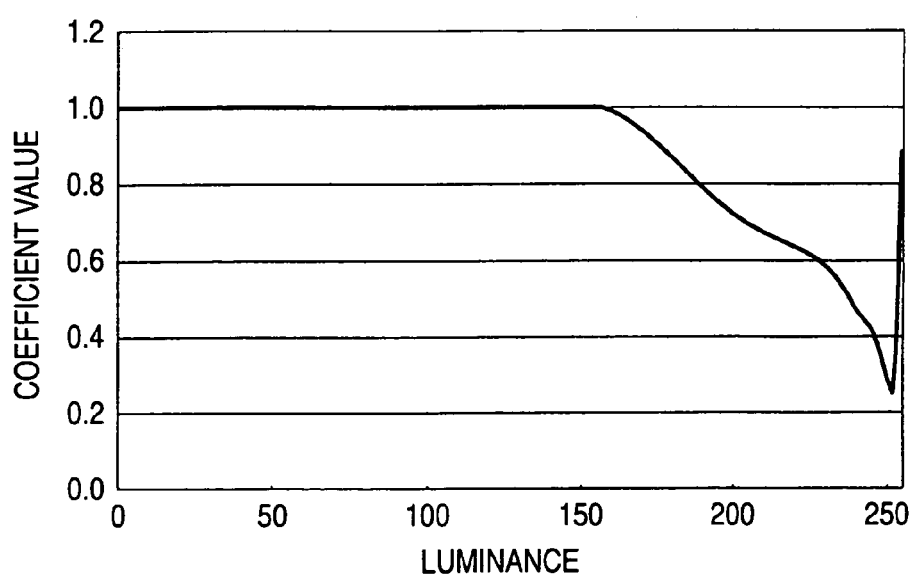
FIG. 11 is a graph showing a luminance dependency coefficient employed in the embodiment of the present invention.

The luminance dependency coefficient K(Y) employed in the above correction of the hue turn and the above correction of the chroma improvement is decided particularly suitably for the flesh color in the section 2 (see FIG. 1). An example of the luminance dependency coefficient K(Y) that is decided suitably for the flesh color is shown in FIG. 11. As described above, the luminance dependency coefficient K(Y) is effective for the hue turn and the chroma improvement in other sections 1, 3, 4, 5, 6. However, if the correction in other sections 1, 3, 4, 5, 6 is performed by using as it is the luminance dependency coefficient that is decided suitably for the correction of the flesh color, variation is caused in the chroma improvement.

For example, the chroma is not so improved in the bluish color. The reason for this may be considered such that an inclination of the color gamut marginal surface to the luminance is large in the bluish section and thus the saturation is separated away from the color gamut (up of the chroma is largely decreased) if Cg has the same amount of movement. Therefore, it is preferable to employ the optimum luminance dependency coefficient in every section.

However, if the individual luminance dependency coefficient is prepared in every section, the large processing load is imposed on the processor of the imaging device. Hence, in the present embodiment, it is assumed that the luminance dependency coefficient decided suitably for the flesh color is corrected and then applied to other section. Thus, as described later, the process of enhancing the luminance dependency coefficient is executed in every section.

More particularly, the luminance range to which the expanding process is applied is extended to the lower luminance range by further narrowing the luminance range in which the luminance dependency coefficient is "1" (i.e., the Cr or Cg expansion is not performed. No process is applied.). In contrast, since the enhancement of the luminance dependency coefficient in the high luminance range excessively corrects the hue of the low chroma color, it is preferable that such enhancement should be avoided.

Then, explanation will be made in more detail hereunder. Here, the luminance dependency coefficient decided suitably for the flesh color is expressed as Ks(Y). If the luminance Y has 8 bit, the luminance Y=0 to 255. In the section 2 including the flesh color, the Cg is converted into Cg'. In this case, Cg'=Cg/Ks(Y) (0<Ks(Y)≦1).

In the sections 1, 3, 4, 5, 6 except the section 2 including the flesh color, the preferable luminance dependency coefficient is not Ks (Y) but K(Y) (0<K(Y)≦1). This transformation formula is given by Cg'=Cg/K(Y). Because the chroma of the flesh color is not so high, the hue turn of the high chroma color cannot be completely corrected by the luminance dependency coefficient Ks(Y) decided suitably for the flesh color. Since the luminance to which the hue turn begins to occur is lower as the higher chroma color, it is preferable that K(Y) is set to "1" or less ("1" or more if the case may be) when the value of the luminance Y is smaller than Ks(Y).

For example, at the time of Y<Y0, Y'=Y0−(Y0−Y)×Z is set and K(Y)=Ks(Y') is assumed. In the case of Y>Y0, K(Y)=Ks(Y) is set, wherein Z is an enhancing factor that has a value of "1" or less. Here, Y0 has any one of values of "0" to "255", and is decided previously every imaging device.

For example, assume that Y0=250, K(Y)=Ks(Y) is satisfied at the time of Y=250 to 255. K(Y) has a pattern obtained by extending Ks(Y) to the low luminance side at the time of Y<250. Thus, the correcting process of the hue turn is started from the lower luminance range, and also the correcting process is enhanced much more at the same luminance.

Figure 12:
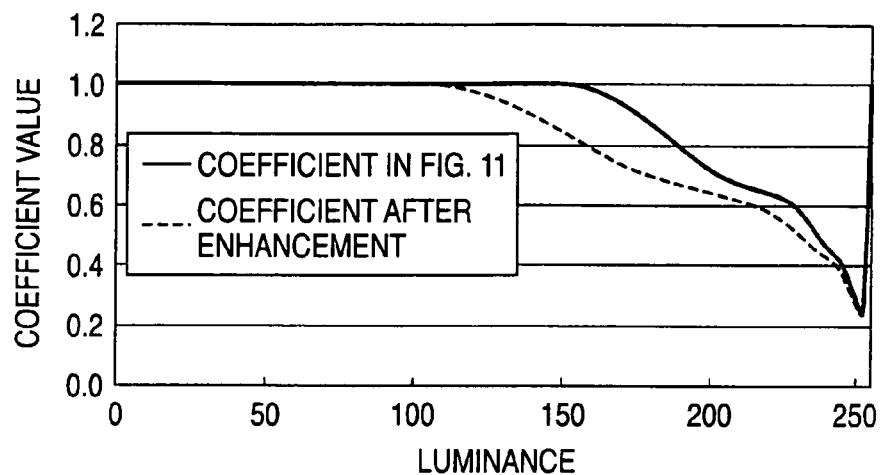
FIG. 12 is a graph in which the luminance dependency coefficient shown in FIG. 11 is enhanced.

Meanwhile, since the high luminance/low chroma color has the small hue turn in every section, it is preferable that the luminance dependency coefficient is not enhanced. The range of Y>Y0 corresponds to such a case. It is preferable that Ks(Y) has the minimum value (or maximum value) at the time of Y=Y0. The case of Z=0.67 is shown in FIG. 12 by taking the luminance dependency coefficient in FIG. 11 as an example.

In this manner, if the color is dropped into the color gamut not to cause the chroma to return so much while mainlining the hue, the noticeable effect can be achieved by using the common luminance dependency coefficient in every section not to cause the reduction in outputting the image.

It is preferable in viewpoints of reduction in processing time and reduction in cost that a look-up table is substituted for the above calculation to incorporate such process into the imaging device. In particular, it is desired that the luminance dependency coefficients should be prepared as the look-up table. Although the effect of the present embodiment can be exhibited irrespective of the signal processing algorithm in the imaging device, the above luminance dependency coefficient has the different value according to the algorithm. Especially, the luminance dependency coefficient is influenced largely by the characteristic curve (the γ transformation characteristic).

Also, if the luminance of the original scene is received up to as high the luminance as possible, normally the saturation is difficult to occur and the flesh color is difficult to saturate. The effect of the present embodiment can also be exhibited in such case. However, if the luminance is received up to the high luminance, the S/N ratio is deteriorated to worsen the roughness of the image, and therefore actually the luminance cannot be received up to the high luminance. In contrast, according to the present embodiment, the noticeable effect can be exhibited though the camera was designed not to receive the luminance up to the high luminance. As the present invention does not require that the characteristic curve has the straight line portion, the effect of the present invention can also be exhibited by any characteristic curve. For example, in FIG. 35, the straight line portion may be a gentle curvature (e.g., "circular arc", or the like). In such case, if the hue turn is small at that portion, the correcting process may be omitted and then the correcting process that is limited in the high luminance range may be applied. Otherwise, the correcting process may be expanded up to the lower luminance range.

In addition, not only the image signal processing device that executes the image signal processing according to the present embodiment can be built in the imaging device, but also such image signal processing device can also exhibit the effect by performing previously the image signal processing to the image when the picked-up image is observed on the monitor or printed by the printer. In other words, if the above correcting operation is carried out before the image in which the flesh color is changed into the yellowish color is output to the monitor or output by the printer, the image in which the yellowish change of the flesh color is improved can be output to the monitor or the printer.

Next, particular examples of the above embodiment will be explained in detail hereunder.

EXAMPLE 1

The color difference matrix (C-MTX) is decided like the following formula in the digital still camera that employs the CCD with the primary color system spectral sensitivity, the Macbeth ColorChecker (18 colors except the gray) is photographed, and then linking loci of respective colors are detected. At that time, results shown in FIG. 13 are derived.

$$C\text{-}MTX = \begin{bmatrix} 1.23 & 0.05 \\ 0.05 & 1.36 \end{bmatrix}$$

Figure 13:
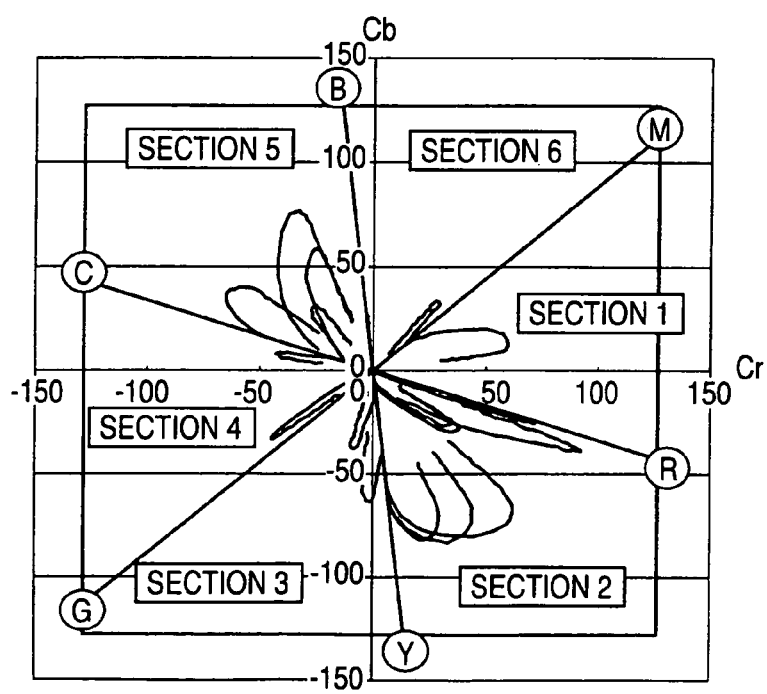
FIG. 13 is a chromaticity diagram in which linking loci of respective colors are detected by imaging the Macbeth ColorChecker (18 colors except the gray)

The gradients of the complementary color lines (or primary color lines) in FIG. 13 are detected as follows. That is, if the gradients at the time of the color difference matrix=1 are expressed as tan Y0, tan M0 and tan C0, the following formula holds.

$$(C\text{-}MTX) \times \begin{bmatrix} 1 \\ \tan X0 \end{bmatrix} = \begin{bmatrix} A \\ B \end{bmatrix}$$

where X denotes Y, M or C, and tan X=B/A.

Therefore, if the gradients are calculated by using the above numerical values, tan Y, tan M and tan C are obtained as follows.

tan Y=−9.008 tan M=0.8868 tan C=−0.3370

In addition, in order to check how the loci of the general colors are given by the digital still camera, the R, G, B signal values as the outputs of the CCD are given by 10 bits at an appropriate equal interval, and then it is detected based on the algorithm in the camera what loci are plotted by the chromaticity points, which are recorded by the camera in all R, G, B combinations (each representing a certain color), together with the exposure. Above FIG. 2 is a graph in which these loci of respective colors are plotted on the Cr-Cb chromaticity diagram from the exposure, which is slightly prior to the occurrence of the hue turn, to the exposure, at which all R, G, B are saturated. In this case, in order to avoid the complication, almost 15 color numbers are extracted in every section.

It is understood from this FIG. 2 that the loci of all colors are turned in the direction directed from the primary color lines, which partition the section to which the color belongs, to the complementary color lines with the increase in an amount of exposure, then such loci overlap with the complementary color lines, and then such loci are directed finally to the origin (white). Exceptions are such colors that exist originally on the primary color lines or the complementary color lines. The loci of the exceptional colors go to and from on respective lines. In any case, any color never protruded to the outside of the section to which the color belongs.

Above FIGS. 3A and 3B, FIGS. 4A and 4B, FIGS. 5A and 5B are views in which the coordinate system is transformed into the coordinate system, which has the complementary color line as an ordinate and has the primary color line as an abscissa in respective sections 1 to 6 in FIG. 2. It can be seen that the almost same patterns are given in all sections. It is appreciated that the same signal processing can be applied to all sections by using this (Cr,Cb)→(Cg,Ch) transformation.

EXAMPLE 2

Figure 34:
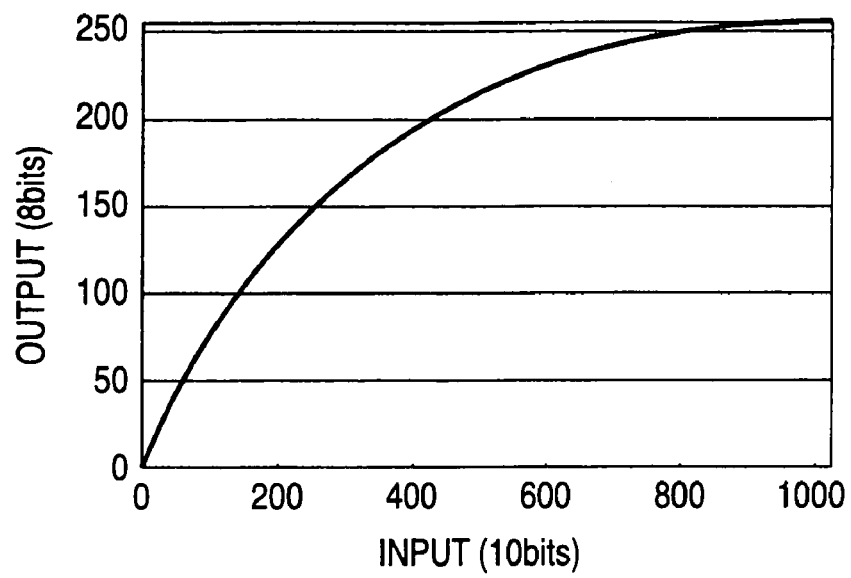
FIG. 34 is a graph showing the $\gamma$ transformation characteristic.

An example executed by the digital still camera using CCD having the primary color system spectral sensitivity will be explained hereunder. The image information picked up at each spectral sensitivity of R, G, B are converted into 8-bit digital values by performing the A/D transformation (10 bit) and the γ transformation. The characteristic line of the γ transformation at this time is given in above FIG. 34.

This γ transformation is the transformation, most portion of which is the straight-line relationship as shown in above FIG. 35 when the luminance values of the image being output finally from the standard CRT are plotted with respect to the luminance values of the original scene. The straight-line portion of the characteristic curve shown in FIG. 35 signifies that the hue in the output image is constant (is not changed) in any color regardless of an amount of exposure.

Figure 14:
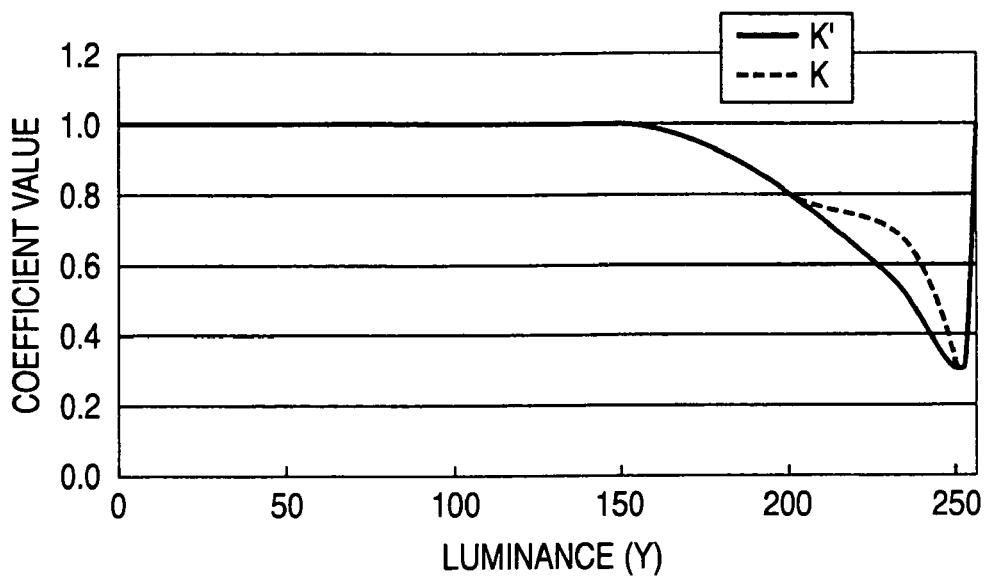
FIG. 14 is a graph showing an example of the enhanced luminance dependency coefficient.

However, when an amount of exposure is increased, the luminance enters into the curvature portion of the characteristic curve and then any output signal of R, G, B is saturated, and thus the hue turn is caused. This behavior is shown in above FIG. 6 and FIG. 7 by taking the flesh color as an example.

Where the Cr/Cb ratio, a value of which obtained at the almost maximum luminance (luminance=158) at which the hue turn does not occur is normalized into "1", is set as the luminance dependency coefficient K. In this case, this Cr/Cb ratio is amended in the luminance range from "250" to "255" to be restored to "1", so that the high luminance and low chroma color is not excessively corrected (the reverse hue turn is not caused). This is shown in FIG. 14.

Then, the Cr, Cb values of the image are processed by using the luminance dependency coefficient K as follows.

$Cr'=(Cr\times A+Cb\times B)/K$ $Cb'=Cr\times C+Cb\times D$ (Formula 1)

$Cr'=Cr\times A+Cb\times B$ $Cb'=Cr\times C+Cb\times D$ (Formula 2)

A, B, C, D in the above-mentioned formulas are coefficients of the color difference matrix, which are identical to those in the color difference matrix in Example 1, and are set originally to this camera. As the value of the luminance dependency coefficient K, the value corresponding to the luminance is detected from FIG. 14 every pixel.

Since R>G>B (section 2) in the flesh color, the calculation in above Formula 1 is applied only to the color that satisfies R>G>B and the calculation in above Formula 2 is applied to other colors. In other words, the calculation of the color difference matrix is applied only to the color that belongs to the section 2, and then the process of expanding Cr by using the luminance dependency coefficient K is executed. In contrast, merely the conventional calculation of the color difference matrix is applied to the colors that belong to other sections.

Figure 15:
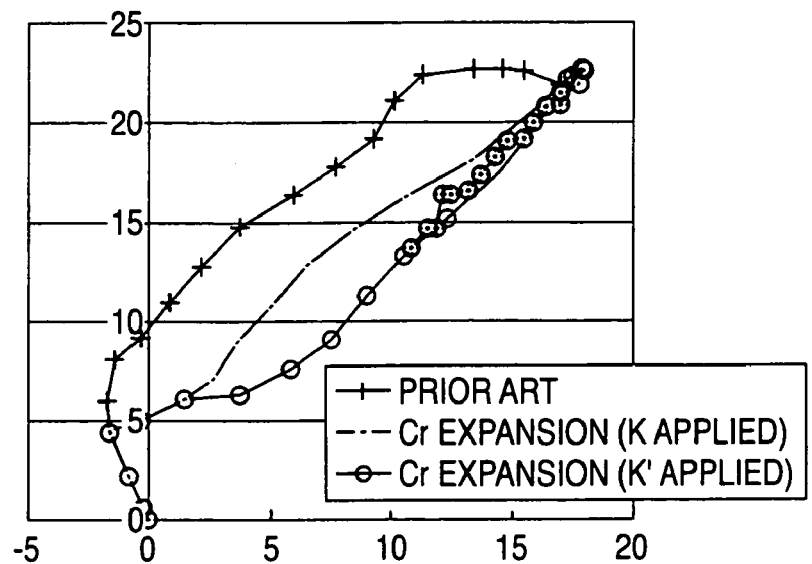
FIG. 15 is a graph showing an exposure dependency of the flesh color.

In this fashion, since the calculations in Formula 1 and Formula 2 are applied to the signals being read from the CCD, new image data that are different from the image data being read from the CCD can be obtained. An exposure dependency of the flesh color of the new image data is indicated by a dot-dash line in FIG. 15.

Figure 16:
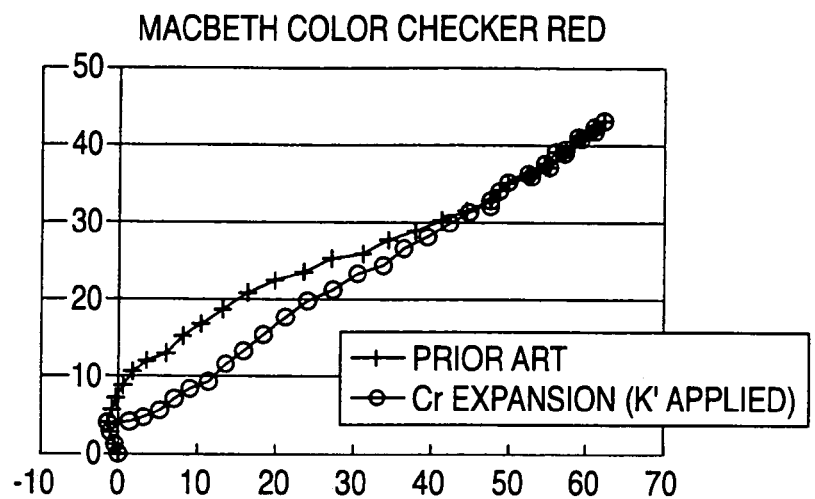
FIG. 16 is a graph showing improvement of the hue turn of the red color of the Macbeth ColorChecker by enhancing the luminance dependency coefficient.

It can be seen that the hue turn can be reduced particularly in contrast to the method in the prior art. However, such reduction of the hue turn is somewhat insufficient. This is because the chromaticity point goes out of the color gamut by the expansion of Cr. Then, the expanding process is performed by applying K' that is derived by enhancing the above luminance dependency coefficient K as indicated by a thick line in FIG. 14. An exposure dependency of the flesh color obtained when K' is applied is indicated by a ○-marked linking line in FIG. 15. It is appreciated that the hue turn is further reduced. All the hue turns of respective colors can be improved by performing the same process to other colors that belong to the same section 2. As this example, the improvement in the hue turn of the red color of the Macbeth ColorChecker is shown in FIG. 16.

Then, as the method of restricting the correction object colors of the hue turn into the section 2, a method of restricting the object colors by using not intensity relationship between R, G, B but the Cr, Cb values after the calculation if the color difference matrix is executed. More particularly, this method decides the color that satisfies with the following relationship as the section 2.

tan Y<Cb/Cr<tan R (=tan C)

Cr>0

The section 2 is partitioned by the primary color line R and the complementary color line Y, but the gradient of the primary color line is equal to the gradient of the complementary color line of the opponent color. Therefore, the expressions in the above relationship can be applied.

Figure 17:
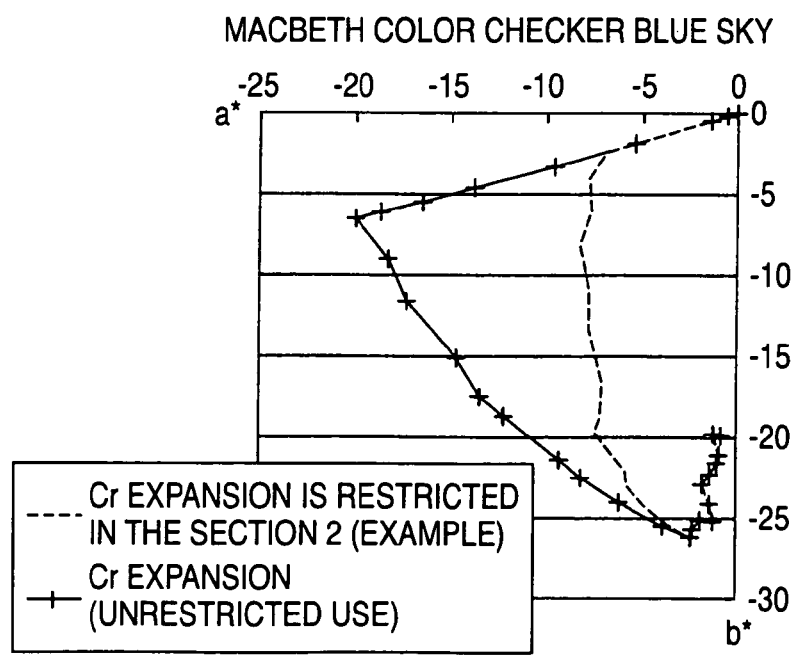
FIG. 17 is a graph (blue sky) showing the harmful influence caused when the same Cr expanding process as the flesh color section is also applied to other sections.
Figure 18:
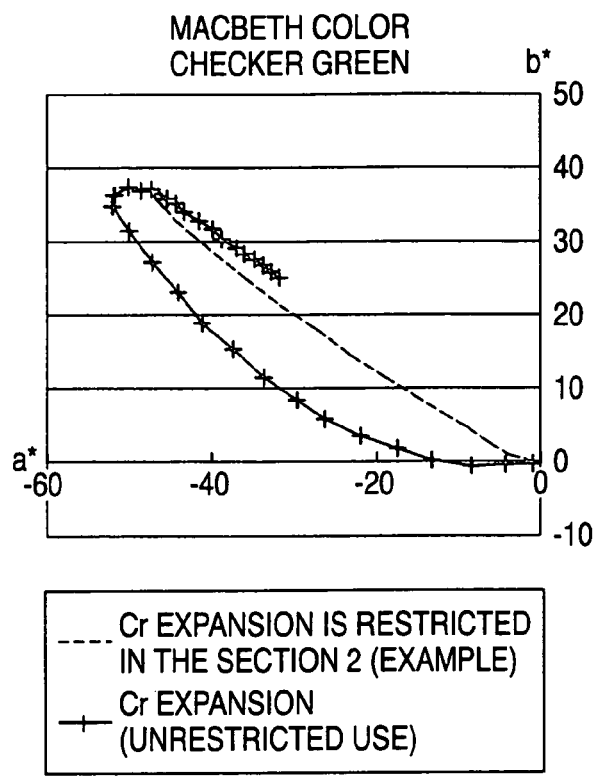
FIG. 18 is a graph (green) showing the harmful influence caused when the same Cr expanding process as the flesh color section is also applied to other sections.

This result is completely identical to the result in which the section 2 is decided by R>G>B. The harmful influence is caused when this Cr expanding process is also applied to other sections. As examples, results obtained by the Macbeth ColorChecker are shown in FIG. 17 and FIG. 18. It can be seen that the hue turn is worsened instead in both cases.

EXAMPLE 3

Figure 19:
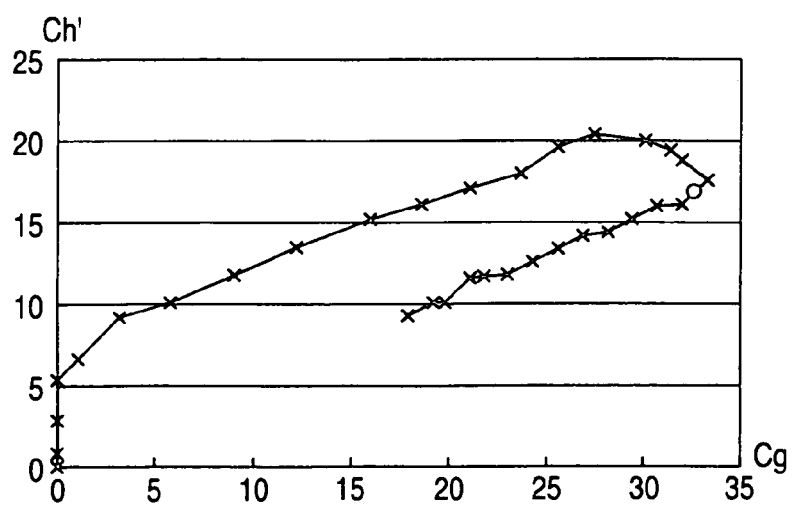
FIG. 19 is a graph showing a locus of the flesh color after the Ch-Cg transformation is applied.

An example in which the hue turn of respective colors in all sections can be improved by transforming (Cr,Cb) obtained after the calculation of the color difference matrix into (Cg,Ch) is shown. A locus of the flesh color obtained after (Cr,Cb) of the flesh color is transformed into (Cg,Ch) by the same transformation as FIG. 3 in Example 1. FIG. 19 shows the locus of the flesh color after the transformation given by the following formula is conducted.

$$Ch'=Ch+0.1\times Cg$$

In above FIG. 11, Ch/Cg is detected from this chromaticity diagram (FIG. 19) and then the Ch/Cg that is normalized by its value at the maximum luminance, at which the flesh color does not cause the hue turn, is set as the luminance dependency coefficient K. Following calculations (1)(2)(3) are executed sequentially by using this luminance dependency coefficient K.

Calculation (1): Cg'=Cg/K

Calculation (2): Ch''=Ch'−0.1×Cg'

Calculation (3): (Cg',Ch'') is inversely transformed into (Cr',Cb').

The inverse transformation means the inverse transformation of the transformation from (Cr,Cb) to (Cg,Ch) shown in Example 1.

Figure 20:
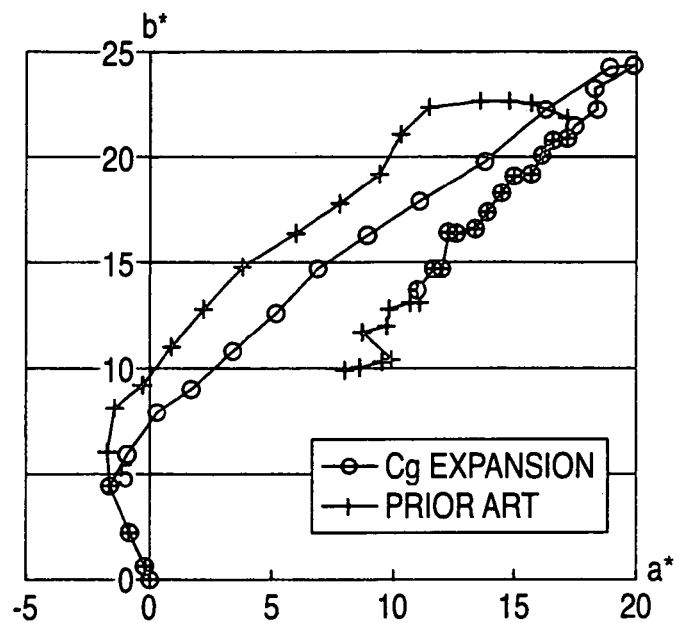
FIG. 20 is an a*-b* chromaticity diagram showing the locus of the flesh color.
Figure 21:
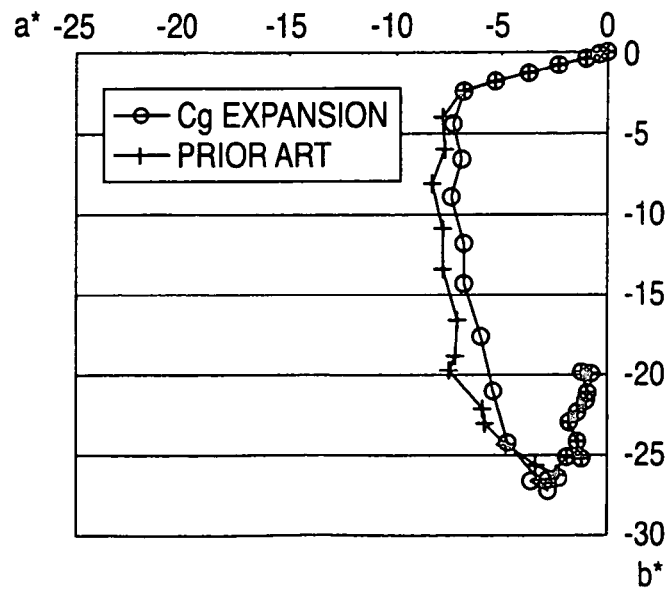
FIG. 21 is a graph showing an example that a calculation for improving the hue turn of the flesh color is applied to other section to which the flesh color does not belong, by using the Macbeth ColorChecker (blue sky)
Figure 22:
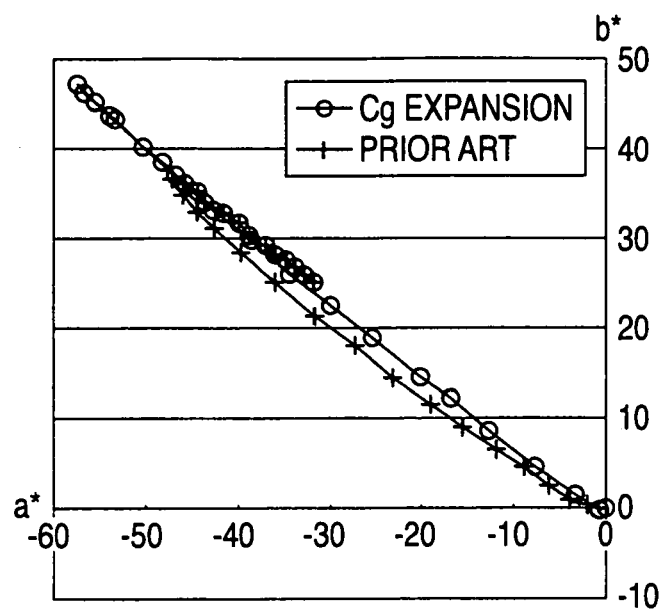
FIG. 22 is a graph showing an example that the calculation for improving the hue turn of the flesh color is applied to other section to which the flesh color does not belong, by using the Macbeth ColorChecker (green)

A view in which the resultant locus of the flesh color is shown in an a*-b* chromaticity diagram is FIG. 20. It is appreciated that the hue turn of the flesh color is remarkably improved. Also, views showing examples, in which this calculation is also applied to other sections except the section 2, by using the Macbeth ColorChecker are FIG. 21 and FIG. 22. It is appreciated that, even if the same calculation is applied after the coordinate transformation, the hue turn is never worsened at all in other sections and rather is improved.

In addition, if (Y,Cr',Cb') are positioned on the higher luminance side than the color gamut marginal surface 0, a following calculation (4) is added after the above calculations (1)(2)(3).

Calculation (4): transformation of Y,Cr',Cb' into Y'',Cr', Cb'

The transformation of this calculation (4) is executed as follows. First, the color gamut marginal surface 0 of the section to which original colors (Y,Cr,Cb) belong is detected. For example, if the section is the section 2, the plane including the point 2, the point 3, and the vertex (255,0,0) out of the point 1, the point 2, and the point 3 explained in above FIG. 9 is the color gamut marginal surface 0.

Figure 23:
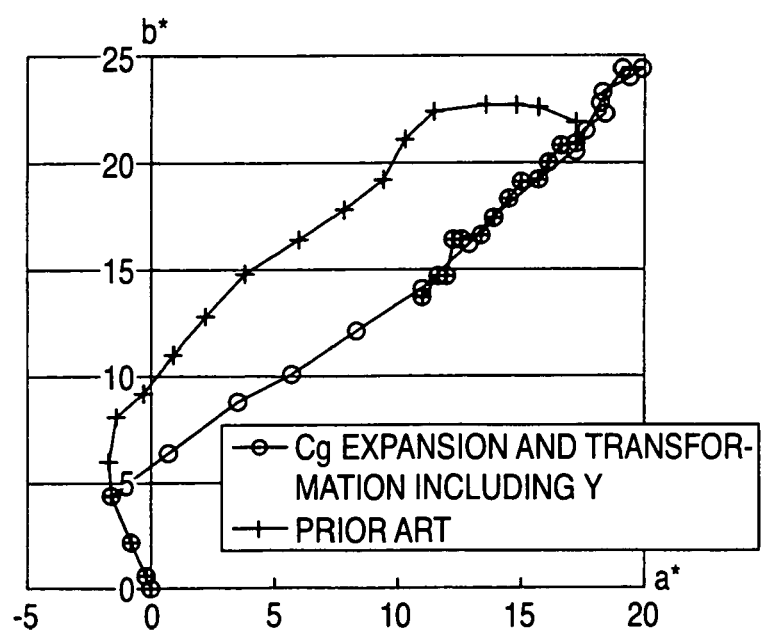
FIG. 23 is a graph showing further improvement of the hue turn by the Cg expanding process and the transforming process including the luminance.

Then, assume that an intersection point between a straight line connecting the point (Y,Cr',Cb') and the origin (0,0,0) and the above plane is set to (Y'',Cr'',Cb''). If doing this, the color is transformed onto the color gamut marginal surface 0 while maintaining the Cb/Cr ratio (i.e., the hue). The result obtained in this manner is shown in FIG. 23. It can be seen that the hue turn is further improved in contrast to FIG. 20 by executing the calculation (4).

Figure 24:
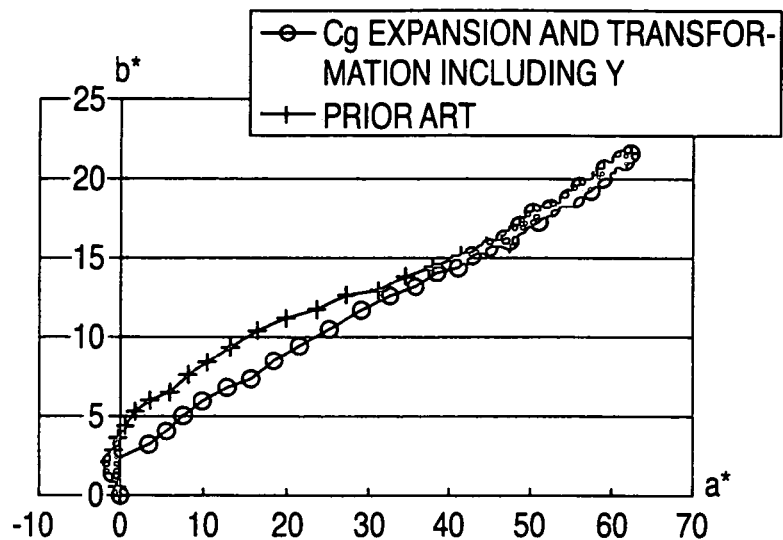
FIG. 24 is a graph showing improvement of the hue turn achieved when the same transforming process as FIG. 23 is applied to other section to which the flesh color does not belong, by using the Macbeth ColorChecker (red)
Figure 25:
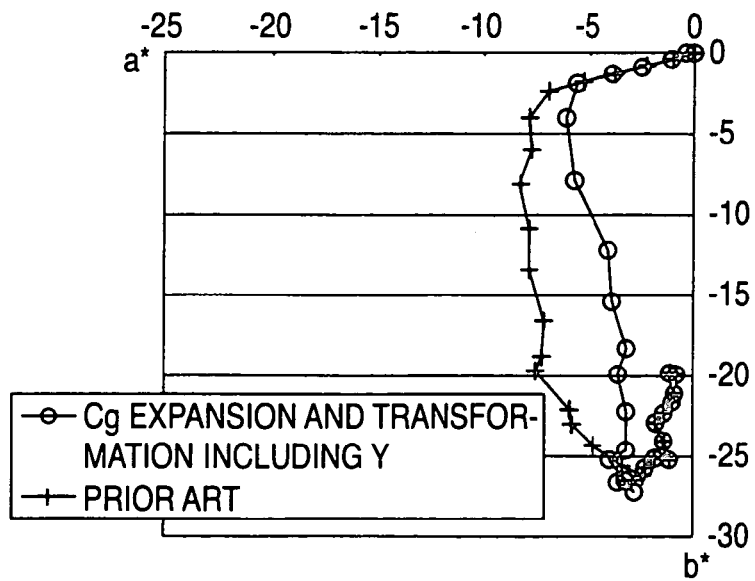
FIG. 25 is a graph showing improvement of the hue turn achieved when the same transforming process as FIG. 23 is applied to other section to which the flesh color does not belong, by using the Macbeth ColorChecker (blue sky)
Figure 26:
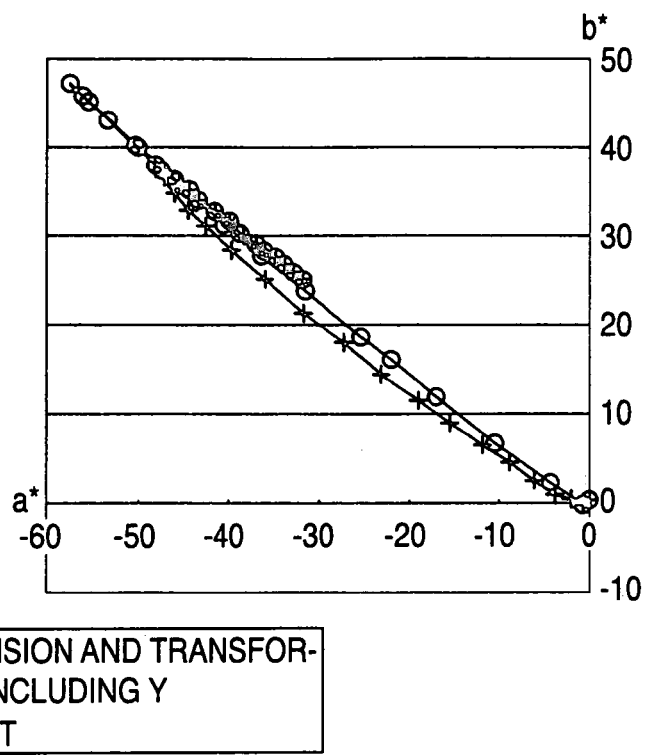
FIG. 26 is a graph showing improvement of the hue turn achieved when the same transforming process as FIG. 23 is applied to other section to which the flesh color does not belong, by using the Macbeth ColorChecker (green)

Also, results obtained by applying the same calculation to the colors, which belong to the sections except the section 2, are shown in FIG. 24 (red), FIG. 25 (blue sky), and FIG. 26 (green) by using the Macbeth ColorChecker. It can be seen from these Figures that not only the hue turn but also the chroma can be improved.

EXAMPLE 4

An example in which the calculation is carried out by imposing a following restriction in the calculation (1) in Example 3 is shown. Concretely the calculation in the following formula is executed in place of the calculation of Cg'=Cg/K.

$$Cg'=Cg/(1-(1-K)\times S)$$

In the above formula, S is a value of "0" to "1" and is decided as follows.

(a) If the chromaticity point (Y,Cr,Cb) is positioned on the lower luminance side than the color gamut marginal surface 2, S=0.

(b) If the chromaticity point (Y,Cr,Cb) is positioned on the higher luminance side than the color gamut marginal surface 1, S=1.

(c) If the chromaticity point (Y,Cr,Cb) is positioned between (a) and (b), S=(Y1−Y)/(Y1−Y2).

Where (Y1,Cr,Cb) is a point on the color gamut marginal surface 1, and (Y2,Cr,Cb) is a point on the color gamut marginal surface 2. Since Y1>Y>Y1, 1>S>0.

Also, in the characteristic curve of the camera in the Example, Y1−Y2=68. That is, the color gamut marginal surface 2 is positioned at a position whose luminance is lower by 68 than the color gamut marginal surface 1. This means that a difference of the output value between the high luminance top end of the characteristic curve shown in FIG. 35 (8-bit output value after the γ transformation=255) and the point at which the characteristic curve shifts from the straight-line portion to the curvature portion (8-bit output value after the γ transformation=187) is "68".

Figure 27:
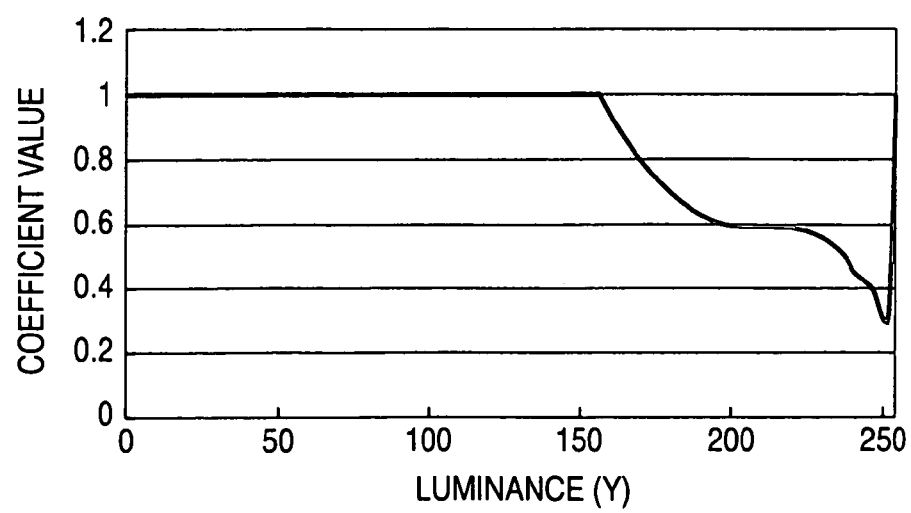
FIG. 27 is a graph showing another example of the enhanced luminance dependency coefficient.
Figure 28:
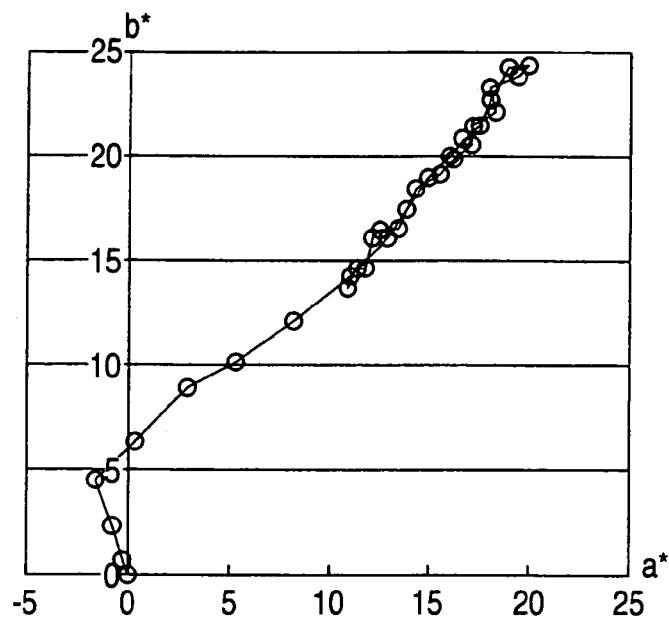
FIG. 28 is a graph showing improvement of the hue turn achieved when calculation in Example 4 according to the embodiment of the present invention is executed, by using the flesh color.
Figure 29:
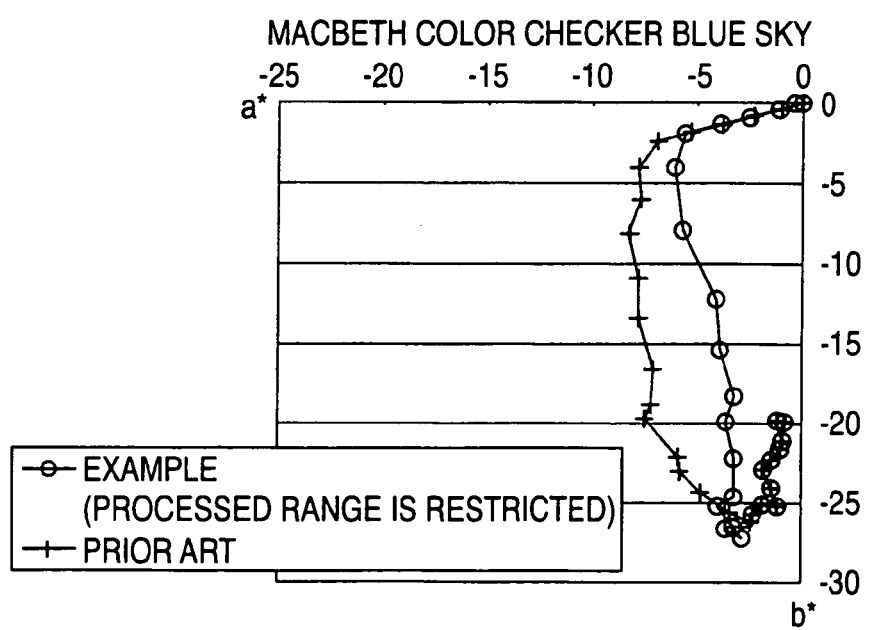
FIG. 29 is a graph showing improvement of the hue turn achieved when the calculation in Example 4 according to the embodiment of the present invention is executed, by using the Macbeth ColorChecker (blue sky)
Figure 30:
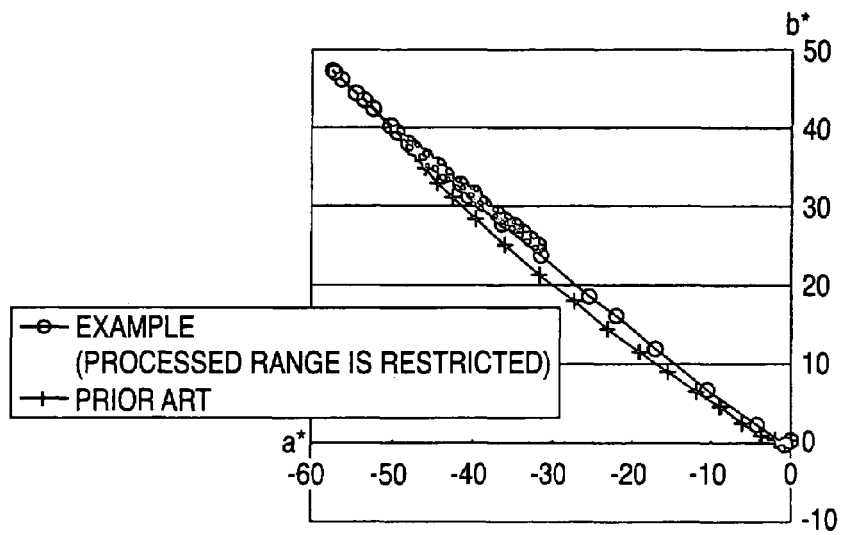
FIG. 30 is a graph showing improvement of the hue turn achieved when the calculation in Example 4 according to the embodiment of the present invention is executed, by using the Macbeth ColorChecker (green)

Also, the value that is enhanced rather than that in Example 3 is set as the luminance dependency coefficient (shown in FIG. 27). This is because a relaxed portion of the luminance dependency coefficient should be canceled by providing the above restriction. Results obtained by executing the calculations (2)(3)(4) in this manner are shown in FIG. 28 (flesh color), FIG. 29 (blue sky of the Macbeth ColorChecker), and FIG. 30 (green of the Macbeth ColorChecker). It is understood that the improving effect can be achieved similarly to Example 3.

In addition, following calculations are added in the sections other than the section 2 in the above calculation. That is, since K is the luminance dependency coefficient in the calculation in the above formula, such K can be expressed as K(Y) more precisely. For example, when K(Y) is referred to by using the luminance (Y) in the look-up table, (A) K(Y) is used if Y≧249, and (B) Y'=249−(249−Y)×Z is calculated and then K(Y') is used if Y<249. In this case, the enhancing factor Z is any positive value of "1" or less. A different value may be used every section, or the same value may be used.

Such calculation is not applied to the color that belongs to the section 2, otherwise Z=1 is set. The value of K(Y) is transformed into the look-up table (LUT), in which such value can have the value of "1" or less up to the lower luminance side, by using this enhancing factor Z. Thus, it may be understood that, although actually one look-up table is used, substantially another look-up table is used every section.

Figure 31:
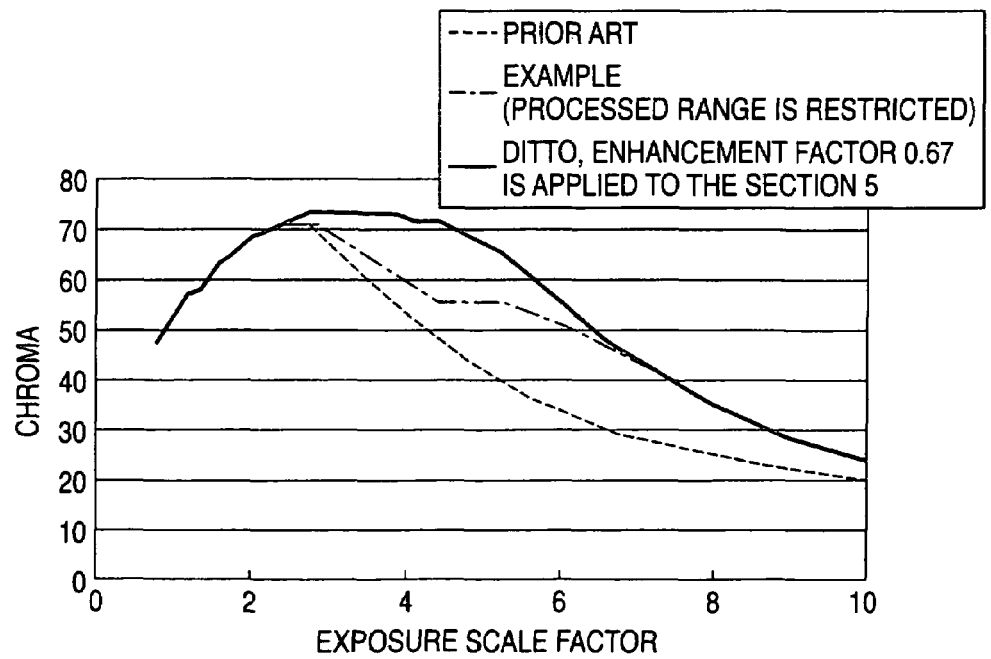
FIG. 31 is a graph showing chroma up effect achieved when the calculation in Example 4 according to the embodiment of the present invention is executed, by using the Macbeth ColorChecker (blue)
Figure 32:
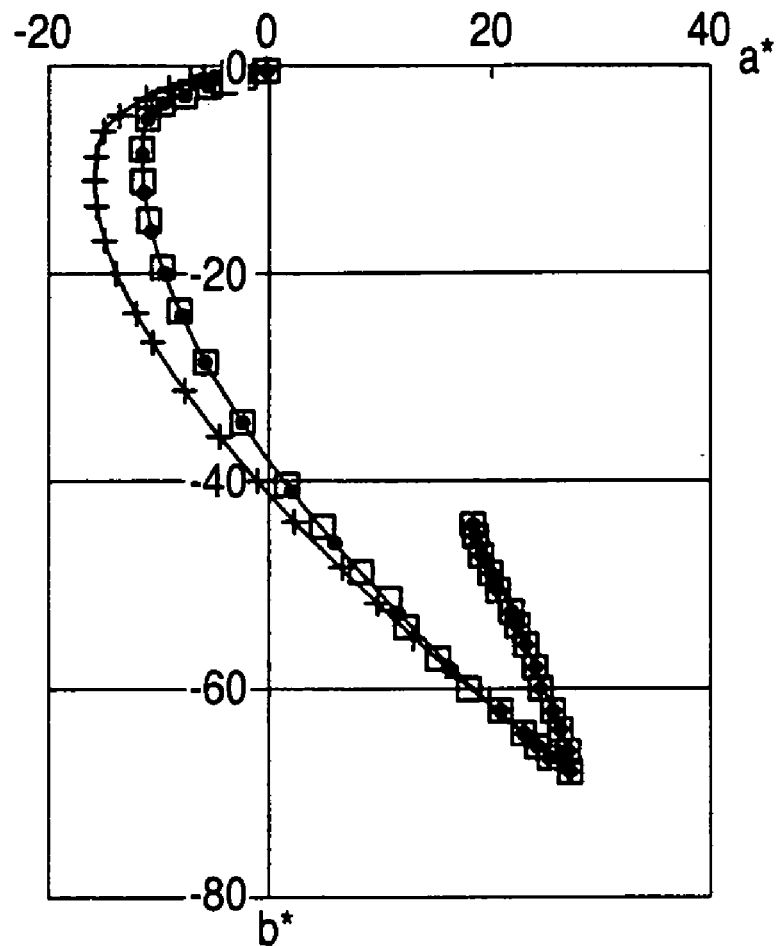
FIG. 32 is a graph showing improvement of the hue turn achieved when the calculation in Example 4 according to the embodiment of the present invention is executed, by using the Macbeth ColorChecker (blue)

As a result, in the sections except the section that includes the flesh color, the hue turn can be reduced much more, or increase of the chroma on the high luminance side can be achieved. The results derived by applying an enhancement factor Z=0.67 to all sections except the section 2 are shown in FIG. 31 and FIG. 32. It is understood that the chroma improving effect becomes remarkable.

Figure 33:
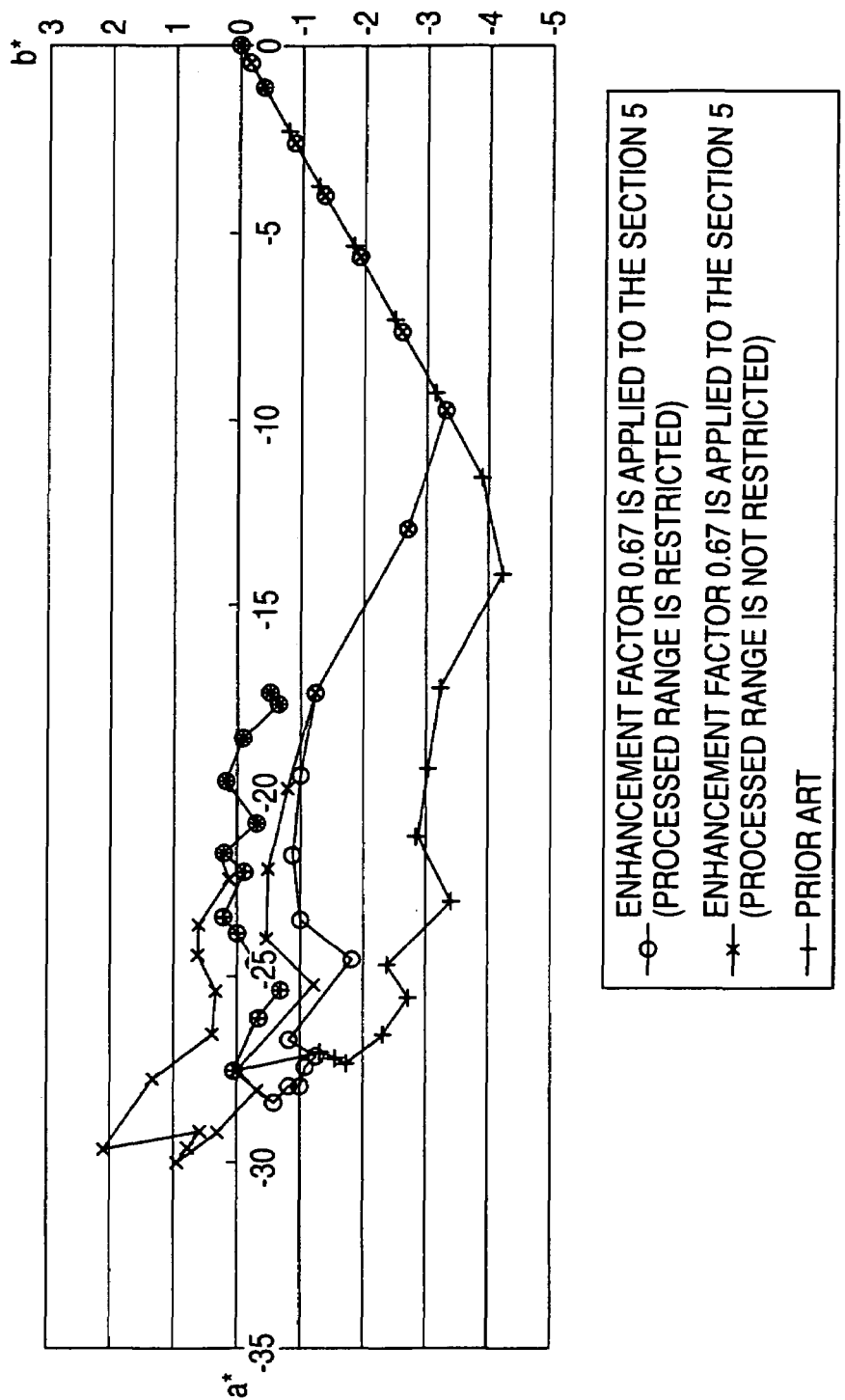
FIG. 33 is a graph showing the situation that the reverse hue turn is caused partially by applying the enhanced calculation up to the color, in which the hue turn does not essentially occur, on the underexposure side.

Also, results obtained by executing the calculation, to which the enhancement factor Z is applied, like the calculations (1)(2)(3)(4) in Example 3 are shown in FIG. 33. It is appreciated that, since the enhanced calculation is applied up to the color in which the hue turn does not essentially occur on the underexposure side, the reverse hue turn is caused partially in the color.

The same result is also derived in the calculation to which the enhancement factor Z is not applied. In other words, it is understood that the restriction in the calculation in the above formula shown in Example 4 is the restriction that is suitable to prevent the situation that the calculation for improving the hue turn is applied up to the color in which the hue turn is not caused. According to the present embodiment, in the color image imaging device such as the digital still camera, or the like, the yellowish change of the flesh color in the area in which the photographing illumination light is strong can be eliminated, and the whitish saturation can be substantially reduced. In addition, the hue turn and the whitish saturation can be improved in the general colors other than the flesh color. Thus, when the recorded image is output, e.g., printed, or the like, the hue turn and the whitish saturation in the flesh color and the general colors can be reduced.

What is claimed is:

1. A color image signal processing method, comprising the steps of:

dividing a chromaticity diagram into a plurality of sections by at least one of primary color lines and at least one of complementary color lines of colors that do not cause hue turn;

deciding to which section a color signal output from an imaging device belongs;

obtaining a difference of luminance between the color signal and a first color gamut marginal surface which is obtained by multiplying a second color gamut marginal surface on a high luminance side with a color difference matrix=1 by a color difference matrix of an imaging device;

obtaining a luminance dependency coefficient for correcting hue turn based on the difference; and performing a color correcting operation for the color signal in each section by multiplying the color difference obtained from the color signal by the luminance dependency coefficient.

2. A color image signal processing method according to claim 1, wherein the color correcting operation is performed after transforming color differences obtained from the color signal into values on an orthogonal coordinates consisting of a primary color axis and a complementary color axis.

3. A color image signal processing method according to claim 1, the color correcting operation is performed for color signals that belong to a section, which includes flesh color, by using a first luminance dependency coefficient.

4. A color image signal processing method according to claim 2, the color correcting operation is performed for color signals that belong to a section, which includes flesh color, by using a first luminance dependency coefficient.

5. A color image signal processing method according to claim 1 or 2, wherein the color correcting operation is performed for colors that belong to at least one of the other sections, which do not include the flesh color, using a second luminance dependency coefficient that is different from the first luminance dependency coefficient.

6. A color image signal processing method according to claim 5, wherein a value of the second luminance dependency coefficient is calculated by amending a value of the first luminance dependency coefficient.

7. A color image signal processing method according to claim 5, wherein the color correcting operation is performed after a calculation of expanding or contracting the second luminance dependency coefficient is executed in at least one of other sections that do not include the flesh color.

8. A color image signal processing method according to claim 1 or 2, further comprising:
    after the step of performing the color correcting operation, shifting chromaticity points onto the color gamut marginal surface on the high luminance side with the color difference matrix=1 by correcting a luminance value and the color differences of the color signals only in colors positioned on a higher luminance side than the color gamut marginal surface.

9. A color image outputting device comprising a processing device for performing the color image signal processing method according to claim 1.

10. An imaging device comprising a processing device for performing the color image processing method according to claim 1.

11. A method of processing color images, comprising:
    deciding to which section a color signal output from an imaging device belongs;
    obtaining a difference of luminance between the color signal and a first color gamut marginal surface which is obtained by multiplying a second color gamut marginal surface on a high luminance side with a color difference matrix=1 by a color difference matrix of an imaging device;
    obtaining a luminance dependency coefficient for correcting hue turn based on the difference; and
    performing a color correcting operation for the color signal in each section by multiplying the color difference obtained from the color signal by the luminance dependency coefficient.

12. A color image signal processing method according to claim 1 or 2, further comprising:
    after the step of performing the color correction operation,
    shifting chromaticity points onto the color gamut marginal surface on the high luminance side with the color difference matrix=1 by correcting component of primary or complementary color axis coordinate of the color signals only in colors positioned on a higher luminance side than the color gamut marginal surface.

* * * * *